(12) United States Patent
Hwang et al.

(10) Patent No.: US 12,051,347 B2
(45) Date of Patent: Jul. 30, 2024

(54) LIGHT EMITTING DISPLAY DEVICE AND DRIVING METHOD THEREOF

(71) Applicant: LG Display Co., Ltd., Seoul (KR)

(72) Inventors: Yi Yeon Hwang, Paju-si (KR); Sung Wook Choi, Paju-si (KR); Kil Hwan Oh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/977,453

(22) Filed: Oct. 31, 2022

(65) Prior Publication Data

US 2023/0215307 A1 Jul. 6, 2023

(30) Foreign Application Priority Data

Dec. 31, 2021 (KR) ........................ 10-2021-0194515

(51) Int. Cl.
*G09G 3/00* (2006.01)
*G09G 3/3258* (2016.01)
*G02F 1/13* (2006.01)
*G02F 1/1362* (2006.01)

(52) U.S. Cl.
CPC ........... *G09G 3/006* (2013.01); *G09G 3/3258* (2013.01); *G02F 1/1309* (2013.01); *G02F 1/136268* (2021.01); *G09G 2320/0295* (2013.01); *G09G 2330/10* (2013.01); *G09G 2330/12* (2013.01)

(58) Field of Classification Search
CPC .. G09G 3/006; G09G 3/3258; G09G 2330/10; G09G 2330/12; G09G 2320/0295; G02F 1/1309; G02F 1/136268

USPC ........................................................ 345/204
See application file for complete search history.

(56) References Cited

U.S. PATENT DOCUMENTS

| | | | | |
|---|---|---|---|---|
| 9,368,063 | B2* | 6/2016 | Chaji | G09G 1/002 |
| 10,593,241 | B2* | 3/2020 | Hong | G09G 3/3233 |
| 11,488,529 | B2* | 11/2022 | Hwang | G09G 3/006 |
| 2011/0074429 | A1* | 3/2011 | Levey | G09G 3/3225 |
| | | | | 324/414 |
| 2017/0004773 | A1* | 1/2017 | Kim | G09G 3/006 |
| 2017/0038427 | A1* | 2/2017 | Kim | G09G 3/006 |
| 2017/0243540 | A1* | 8/2017 | Liu | G09G 3/3258 |
| 2018/0033373 | A1* | 2/2018 | Hong | G09G 3/325 |
| 2018/0061292 | A1* | 3/2018 | Hong | G09G 3/3233 |
| 2018/0330649 | A1* | 11/2018 | Zhu | H10K 59/123 |
| 2019/0122616 | A1* | 4/2019 | Lee | G09G 3/3266 |
| 2019/0221146 | A1* | 7/2019 | Lin | G09G 3/006 |
| 2020/0074938 | A1* | 3/2020 | Kim | G09G 3/3275 |
| 2020/0402432 | A1* | 12/2020 | Yang | G09G 3/3233 |
| 2021/0072608 | A1* | 3/2021 | Iwasa | G02F 1/1368 |
| 2021/0074235 | A1* | 3/2021 | Iwasa | G09G 3/3614 |
| 2021/0149264 | A1* | 5/2021 | Iwasa | G02F 1/136286 |
| 2021/0166637 | A1* | 6/2021 | Cho | G09G 3/3258 |
| 2021/0295791 | A1* | 9/2021 | Iwasa | G09F 9/30 |

(Continued)

*Primary Examiner* — Tom V Sheng
(74) *Attorney, Agent, or Firm* — Birch, Stewart, Kolasch & Birch, LLP

(57) ABSTRACT

A light emitting display device can include a display panel configured to display an image; a driver configured to drive the display panel; a controller configured to control the driver; and a defect sensing circuit configured to sense a current through a driving voltage line transmitting a driving voltage for driving of the display panel, and output a sensing value based on the current for determining whether an element in a subpixel of the display panel is defective.

19 Claims, 25 Drawing Sheets

(56) References Cited

U.S. PATENT DOCUMENTS

| | | | |
|---|---|---|---|
| 2022/0139325 A1* | 5/2022 | Lee | G06F 3/147 |
| | | | 345/694 |
| 2023/0057700 A1* | 2/2023 | Kim | G09G 3/3233 |
| 2023/0068639 A1* | 3/2023 | Hong | G09G 3/3291 |
| 2023/0078752 A1* | 3/2023 | Yu | G09G 3/3233 |
| | | | 345/694 |
| 2023/0095234 A1* | 3/2023 | Lee | G09G 3/006 |
| | | | 345/55 |
| 2023/0186804 A1* | 6/2023 | Yamada | G09G 3/32 |
| | | | 345/214 |

* cited by examiner

LIGHT EMITTING DISPLAY DEVICE AND DRIVING METHOD THEREOF

CROSS REFERENCE TO RELATED APPLICATION

This application claims priority to Korean Patent Application No. 10-2021-0194515 filed in the Republic of Korea on Dec. 31, 2021, the entirety of which is hereby incorporated by reference as if fully set forth herein.

BACKGROUND OF THE INVENTION

Field of the Invention

The present invention relates to a light emitting display device and a driving method thereof.

Discussion of the Related Art

In accordance with further developments in information technology, the market for display devices as a medium interconnecting users and information is expanding. As such, use of display devices, such as a light emitting display (LED) device, a quantum dot display (QDD) device, a liquid crystal display (LCD) device and the like, is increasing.

The above-mentioned display devices include a display panel including subpixels, a driver configured to output a drive signal for driving the display panel, and a power supply configured to generate electric power to be supplied to the display panel or the driver.

When drive signals, for example, scan signals and data signals, are supplied to subpixels formed at a display panel in a display device as mentioned above, selected ones of the subpixels transmit light or directly emit light and, as such, the display device can display an image.

However, if any of the subpixels have defective elements, image quality can be degraded and an afterimage that is noticeable to a viewer may be present. Also, additional circuitry may be provided within each subpixel circuit for detecting defective elements, but this can undesirably result in a decreased aperture, increased subpixel complexity, and increased manufacturing costs. Accordingly, there exists a need for accurately detecting defective elements within subpixels, and doing so without requiring additional circuit elements within each subpixel circuit.

SUMMARY OF THE INVENTION

Accordingly, the present disclosure is directed to a light emitting display device and a driving method thereof that substantially obviate one or more problems due to limitations and disadvantages of the related art.

An object of the present invention is to provide a light emitting display device and a driving method thereof which are capable of detecting and determining whether or not elements included in a subpixel have failed, without the addition of a separate transistor or a separate sensing line to an interior of the subpixel, thereby achieving an enhancement in lifespan, production yield, reliability and stability while also removing or preventing an afterimage.

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, a light emitting display device includes a display panel configured to display an image, a driver configured to drive the display panel, a controller configured to control the driver, and a defect sensing circuit configured to sense current through a driving voltage line transmitting a driving voltage for driving of the display panel and to output a sensing value for determining whether an element in a subpixel of the display panel is defective based on the sensed current.

The defect sensing circuit can sense a first driving voltage line supplying a first driving voltage of a high level to the display panel or a second driving voltage line supplying a second driving voltage of a low level to the display panel.

The controller can analyze the sensing value transmitted from the defect sensing circuit, and determine that the element included in the sensed sub-pixel is defective when the current is sensed through the driving voltage line.

The defect sensing circuit can include a sensing circuit configured to sense failure of the subpixel through the driving voltage line, and a switch circuit configured to interconnect the driving voltage line and the sensing circuit unit.

The switch circuit can connect the driving voltage line to a driving voltage source during a driving period. The switch circuit can connect the driving voltage line to the sensing circuit unit during a sensing period.

The defect sensing circuit can include a current amplification circuit configured to amplify a sensing current value transmitted through the switch circuit unit and to output the amplified sensing current value, a current-to-voltage converter configured to convert the sensing current value output from the current amplification circuit into a sensing voltage value and to output the sensing voltage value, and an analog-to-digital converter configured to convert the sensing voltage value output from the current-to-voltage converter into a digital form and to output the resultant voltage value.

The defect sensing circuit can further include a noise removal circuit configured to remove a noise component of the sensing voltage value output from the current-to-voltage converter and to transmit the resultant voltage value to the analog-to-digital converter.

The noise removal circuit can calculate a difference value between two sensing voltage values sensed from a first display area and a second display area of the display panel, can amplify the calculated difference value, and can output the amplified value as a sensing voltage value.

The driving voltage line can be divided into various lines corresponding to respective display areas of the display panel.

The display panel can further include a voltage line connector configured to interconnect, in common, the various lines of the driving voltage line divided to correspond to respective display areas.

In another aspect of the present invention, there is provided a driving method of a light emitting display device including a display panel configured to display an image, a driver configured to drive the display panel, a controller configured to control the driver, and a sensing unit configured to sense current through a driving voltage line transmitting a driving voltage for driving of the display panel, the driving method including driving at least one first pixel disposed in a first display area of the display panel and at least one second pixel disposed in a second display area of the display panel, sensing a driving voltage line connected to the at least one first pixel and a driving voltage line connected to the at least one second pixel, and determining failure of an element included in the display panel, based on a first sensing current value sensed through the driving voltage line connected to the at least one first pixel and a second sensing current value sensed through the driving voltage line connected to the at least one second pixel.

At least one of the first sensing current value and the second sensing current value can be used as a reference for removal of a noise component.

In accordance with the example embodiments of the present invention, it can be possible to detect and determine whether or not elements included in a subpixel have failed, without the addition of a separate transistor or a separate sensing line to an interior of the subpixel, thereby achieving an enhancement in lifespan and production yield while removing or preventing an afterimage. In addition, in accordance with the example embodiments of the present invention, it can be possible to easily detect pixels having progressive failure generated after shipment of a display panel, thereby achieving an enhancement in reliability and stability. Furthermore, when the example embodiments of the present invention are applied to a subpixel implemented based on a circuit such as 2T1C, an enhancement in aperture ratio can be achieved. In addition, the example embodiments of the present invention are applicable to subpixels of various types and, as such, there is an effect of reducing costs while enhancing versatility of the resultant device.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE EMBODIMENTS

A display device according to an example embodiment of the present invention can be implemented as a television, an image player, a personal computer (PC), a home theater, an automobile electric device, a smartphone, etc., without being limited thereto. The display device according to the example embodiment of the present invention can be implemented as a light emitting display (LED) device, a quantum dot display (QDD) device, a liquid crystal display (LCD) device, etc. However, the following description will be given in conjunction with, for example, a light emitting display device configured to directly emit light based on an inorganic light emitting diode or an organic light emitting diode, for convenience of description.

A thin film transistor, which will be described hereinafter, can be implemented in the form of an n-type thin film transistor, a p-type thin film transistor or a thin film transistor having a type in which both the n type and the p type are present. The thin film transistor can be a triple-electrode element including a gate, a source and a drain. The source is an electrode configured to supply a carrier to the transistor. The carrier in the thin film transistor first flows from the source. The drain is an electrode from which the carrier is discharged from the thin film transistor to an exterior of the thin film transistor. That is, the carrier in the thin film transistor flows from the source to the drain.

In the situation of a p-type thin film transistor, a source voltage has a higher level than a drain voltage such that a hole can flow from a source to a drain because the hole is a carrier. In the p-type thin film transistor, current flows from the source to the drain because the hole flows from the source to the drain. Conversely, in an n-type thin film transistor, a source voltage has a lower level than a drain voltage such that an electron can flow from a source to a drain because the electron is a carrier. In the n-type thin film transistor, current flows from the drain to the source because the electron flows from the source to the drain. In a thin film transistor, however, a source and a drain can be interchanged in accordance with voltages applied thereto. Taking into consideration such conditions, one of the source and the drain will be referred to as a "first electrode," and the other of the source and the drain will be referred to as a "second electrode."

Figure 1:
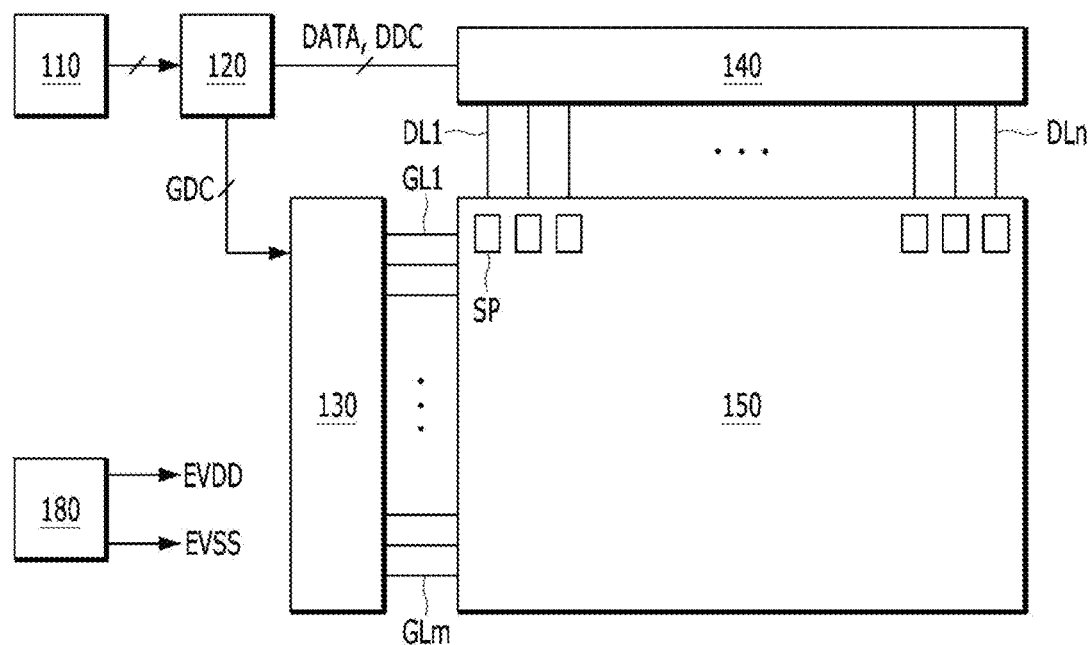
FIG. 1 is a block diagram schematically showing a light emitting display device according to an embodiment of the present invention.
Figure 2:
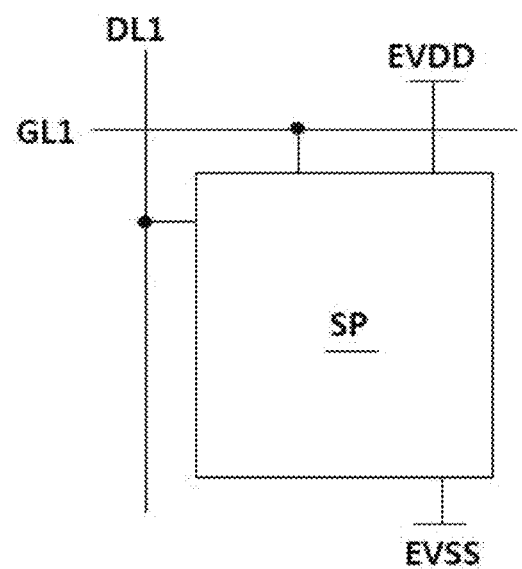
FIG. 2 is a diagram schematically showing a subpixel shown in FIG. 1 according to an embodiment of the present invention.

FIG. 1 is a block diagram schematically showing a light emitting display device. FIG. 2 is a diagram schematically showing a subpixel shown in FIG. 1 according to embodiments of the present invention.

As shown in FIGS. 1 and 2, the light emitting display device can include an image supplier 110 (e.g., host system), a timing controller 120, a scan driver 130 (e.g., gate driver), a data driver 140, a display panel 150, a power supply 180, etc.

The image supplier 110 (a set or a host system) can output various driving signals together with an image data signal supplied from an exterior thereof or an image data signal stored in an internal memory thereof. The image supplier 110 can supply a data signal and various driving signals to the timing controller 120.

The timing controller 120 can output a gate timing control signal GDC for control of an operation timing of the scan driver 130, a data timing control signal DDC for control of an operation timing of the data driver 140, various synchronization signals (a vertical synchronization signal Vsync and a horizontal synchronization signal Hsync, etc). The timing controller 120 can supply, to the data driver 140, a data signal DATA supplied from the image supplier 110 together with the data timing signal DDC. The timing controller 120 can take the form of an integrated circuit (IC) and, as such, can be mounted on a printed circuit board, without being limited thereto.

The scan driver 130 can output a scan signal (or a scan voltage) in response to the gate timing control signal GDC supplied from the timing controller 120. The scan driver 130 can supply a scan signal to the subpixels included in the display panel 150 through gate lines GL1 to GLm, where m can be a positive integer. The scan driver 130 can take the form of an IC or can be directly formed on the display panel 150 in a gate-in-panel manner, without being limited thereto.

The data driver 140 can sample and latch a data signal DATA in response to the data timing control signal DDC supplied from the timing controller 120, can convert the resultant data signal, which has a digital form, into a data voltage having an analog form, based on a gamma reference voltage, and can output the data voltage. The data driver 140 can supply the data voltage to the subpixels included in the display panel 150 through data lines DL1 to DLn, where n can be a positive integer. The data driver 140 can take the form of an IC and, as such, can be mounted on the display panel 150 or can be mounted on a printed circuit board, without being limited thereto.

The power supply 180 can generate a first driving voltage of a high level and a second driving voltage of a low level based on an external input voltage supplied from an exterior thereof, and can output the first driving voltage and the second driving voltage through a first driving voltage line EVDD and a second driving voltage line EVSS. The power supply 180 can generate and output not only the first driving voltage and the second driving voltage, but also a voltage (for example, a gate voltage including a gate-high voltage and a gate-low voltage) for driving of the scan driver 130, a voltage (a drain voltage and a drain voltage including a half drain voltage) for driving of the data driver 140, etc.

The display panel 150 can display an image, corresponding to the driving signal including the scan signal and the data voltage, the first driving voltage, the second driving voltage, etc. The subpixels of the display panel 150 can directly emit light. The display panel 150 can be fabricated based on a substrate having stiffness or ductility, such as glass, silicon, polyimide or the like. The subpixels, which emit light, can be constituted by red, green and blue subpixels or red, green, blue and white subpixels.

For example, one subpixel SP can include a pixel circuit connected to a first data line DL1, a first gate line GL1, a first driving voltage line EVDD and a second driving voltage line EVSS while including a switching transistor, a driving transistor, a capacitor, an organic light emitting diode, etc. The pixel circuit of the subpixel SP, which is used in the light emitting display device, can be configured in various forms. For convenience of illustration, however, the subpixel SP is simply shown in the form of a block.

Meanwhile, in the above description, the timing controller 120, the scan driver 130, the data driver 140, etc. have been described as having individual configurations, respectively. However, one or more of the timing controller 120, the scan driver 130 and the data driver 140 can be integrated into one combined IC in accordance with an implementation type of the light emitting display device.

Figure 3:
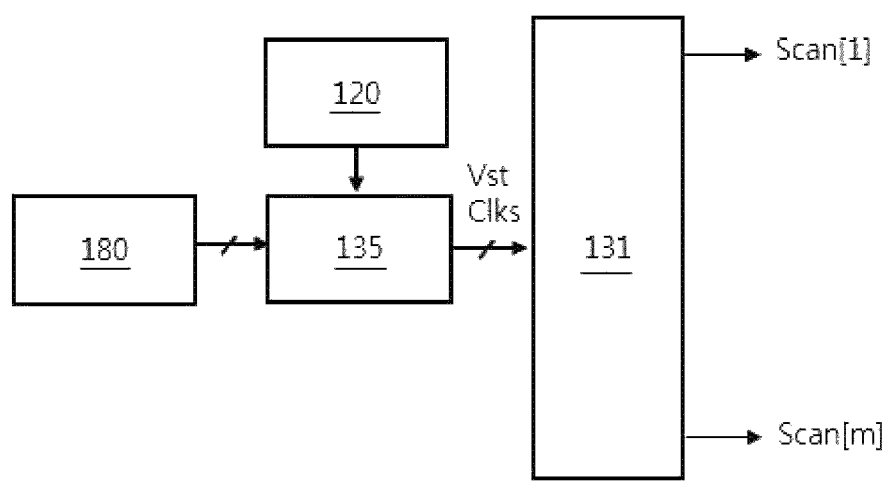
FIGS. 3 and 4 are views explaining a configuration of a gate-in-panel type scan driver according to embodiments of the present invention.
Figure 4:
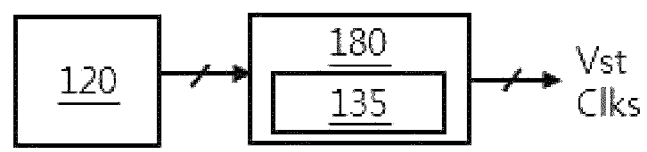
Figure 5A:
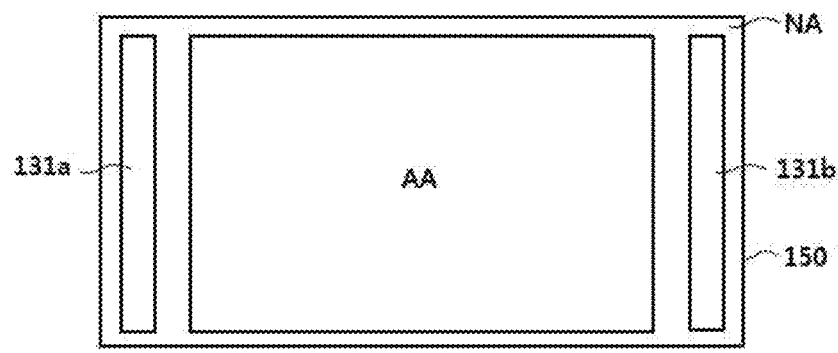
FIGS. 5A and 5B are views showing disposition examples of a gate-in-panel type scan driver according to embodiments of the present invention.
Figure 5B:
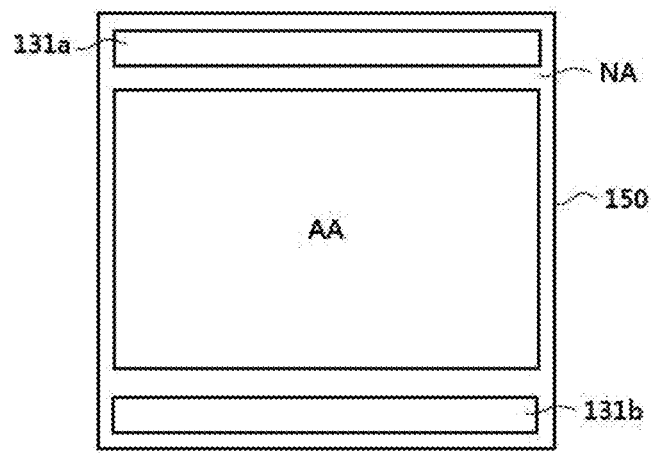
Figure 6:
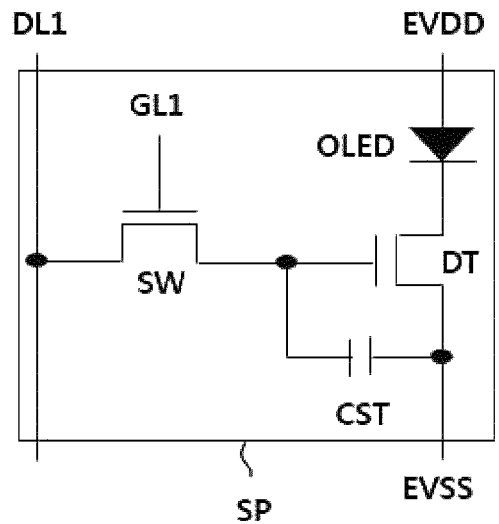
FIG. 6 is a diagram of a concrete circuit configuration of a subpixel according to an embodiment of the present invention.

FIGS. 3 and 4 are views explaining a configuration of a gate-in-panel type scan driver. FIGS. 5A and 5B are views showing disposition examples of a gate-in-panel type scan driver. FIG. 6 is a diagram of a concrete circuit configuration of a subpixel.

As shown in FIG. 3, the gate-in-panel type scan driver can include a shift register 131 and a level shifter 135. The level shifter 135 can generate scan clock signals Clks, a start signal Vst, etc. based on signals and voltages output from a timing controller 120 and a power supply 180. The scan clock signals Clks can be generated under the condition that the scan clock signals Clks have J different phases (J being an integer of 2 or greater), such as 2-phase, 4-phase, 8-phase, etc.

The shift register 131 can operate based on the signals Clks and Vst, etc. output from the level shifter 135, and can output scan signals Scan[1] to Scan[m] capable of turning on or off transistors formed at a display panel. The shift register 131 can be formed on the display panel in a gate-in-panel manner in the form of a thin film.

As shown in FIGS. 3 and 4, the level shifter 135 can be independently formed in the form of an IC or can be internally included in the power supply 180, differently from the shift register 131. However, this configuration is only illustrative, and the example embodiments of the present invention are not limited thereto.

As shown in FIGS. 5A and 5B, shift registers 131a and 131b, which output scan signals in a gate-in-panel type scan driver, can be disposed in a non-display area NA of a display panel 150. The shift registers 131a and 131b can be disposed in left and right non-display areas NA of the display panel 150, as shown in FIG. 5A, or can be disposed in upper and lower non-display areas NA of the display panel 150, as shown in FIG. 5B. Meanwhile, although the shift registers 131a and 131b have been shown and described with reference to FIGS. 5A and 5B in conjunction with an example in which the shift registers 131a and 131b are disposed in the non-display area NA, the example embodiments of the present invention are not limited thereto.

As shown in FIG. 6, the subpixel can include a switching transistor SW, a driving transistor DT, a capacitor CST, and an organic light emitting diode OLED.

The switching transistor SW can be connected, at a gate electrode thereof, to a first gate line GL1 while being connected, at a first electrode thereof, to a first data line DL1 and connected, at a second electrode thereof, to a gate electrode of the driving transistor DT and a first electrode of the capacitor CST. The switching transistor SW can function to transmit, to the first electrode of the capacitor CST, a data voltage applied thereto through the first data line DL1.

The driving transistor DT can be connected, at the gate electrode thereof, to the second electrode of the switching transistor SW and the first electrode of the capacitor CST while being connected, at a first electrode thereof, to a cathode of the organic light emitting diode OLED and connected, at a second electrode thereof, to a second electrode of the capacitor CST and a second power line EVSS. The driving transistor DT can function to generate driving current, corresponding to a data voltage stored in the capacitor CST.

The capacitor CST can be connected, at the first electrode thereof, to the second electrode of the switching transistor SW and the gate electrode of the driving transistor DT while being connected, at the second electrode thereof, to the second electrode of the driving transistor DT and the second power line EVSS. The capacitor CST can function to store a data voltage for driving of the driving transistor DT.

The organic light emitting diode OLED can be connected, at an anode thereof, to a first power line EVDD while being connected, at the cathode thereof, to the first electrode of the driving transistor DT. The organic light emitting diode OLED can function to emit light, corresponding to operation (driving current) of the driving transistor DT.

The example embodiments of the present invention, which will be described in more detail hereinafter, relate to an apparatus and a method capable of sensing whether or not elements included in a subpixel SP have failed, without the addition of a separate transistor or a separate sensing line to an interior of the subpixel SP. For better understanding of the present invention, accordingly, the example embodiments of the present invention will be described hereinafter in conjunction with, for example, the subpixel SP of FIG. 6 described above.

Meanwhile, the apparatus according to the example embodiments of the present invention can sense whether or not elements included in the subpixel SP have failed, through a first driving voltage line EVDD or a second driving voltage line EVSS connected to the subpixel SP. In the following description, however, the example embodiments of the present invention will be described in conjunction with an example in which whether or not the elements included in the subpixel SP have failed is sensed through the second driving voltage line EVSS connected to the subpixel SP, for better understanding of the present invention.

Figure 7:
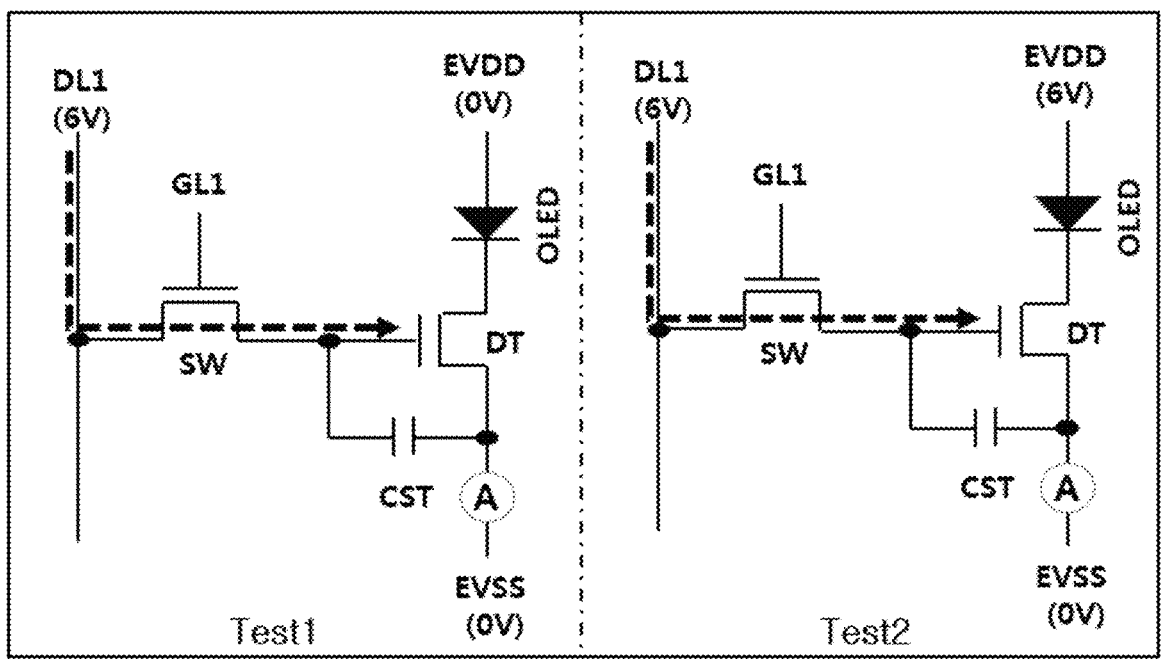
FIGS. 7 and 8 are diagrams explaining sensing results according to an embodiment of the present invention when the elements included in the subpixel of FIG. 6 operate normally.
Figure 8:
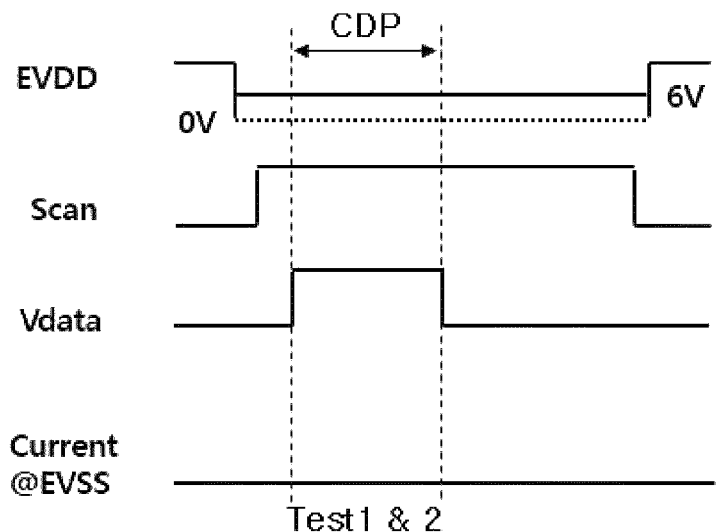
Figure 9:
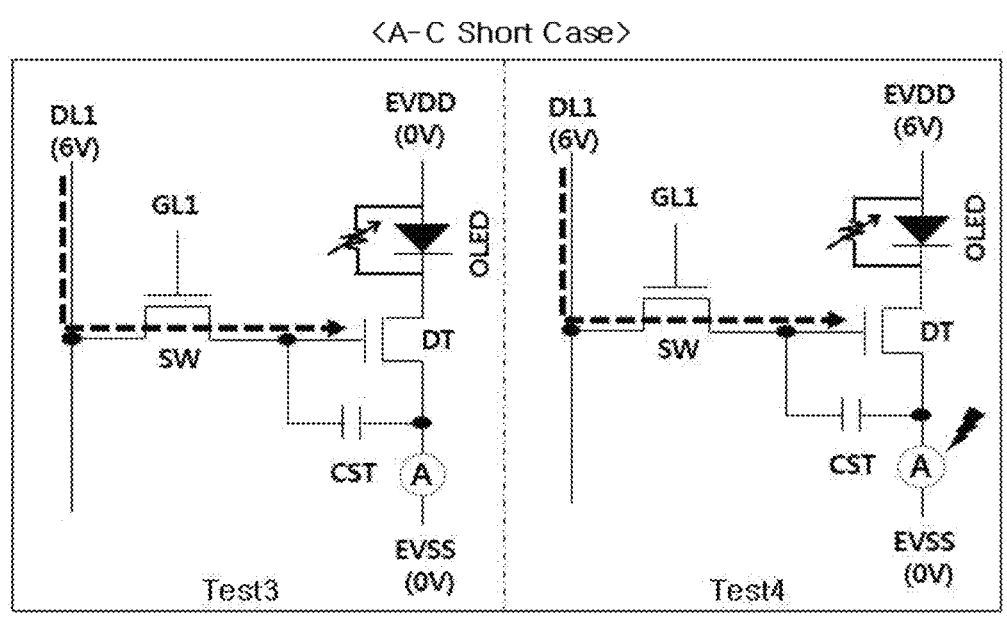
FIGS. 9 and 10 are diagrams explaining sensing results according to an embodiment of the present invention when a short circuit has occurred between both ends (an anode and a cathode) of the organic light emitting diode included in the subpixel of FIG. 6.
Figure 10:
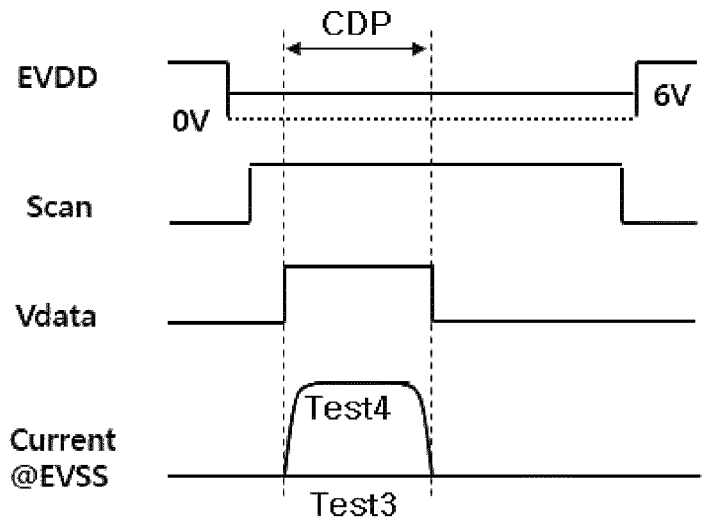
Figure 11:
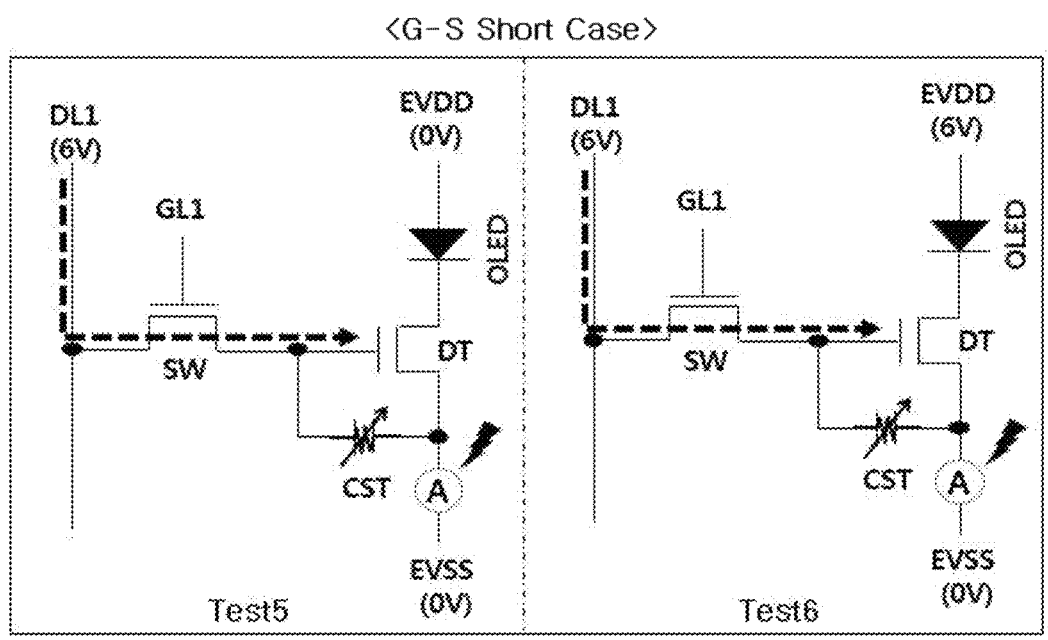
FIGS. 11 and 12 are diagrams explaining sensing results according to an embodiment of the present invention when a short circuit has occurred between gate and source electrodes of the driving transistor included in the subpixel of FIG. 6.
Figure 12:
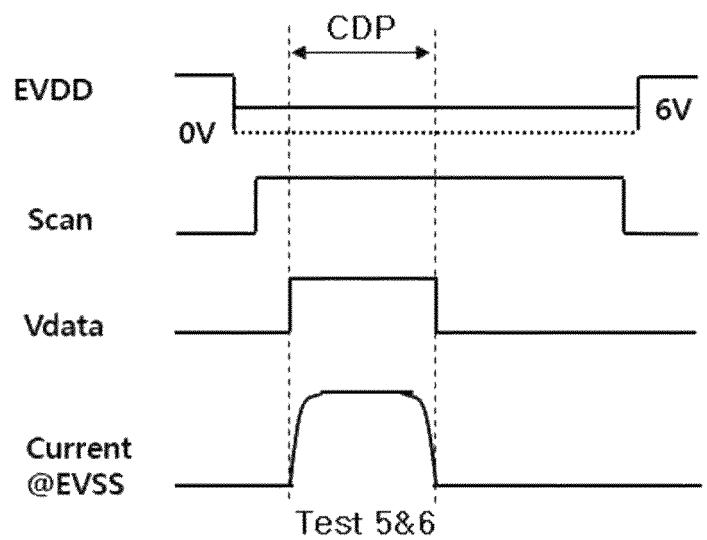

FIGS. 7 and 8 are diagrams explaining sensing results according to an example embodiment of the present invention when the elements included in the subpixel of FIG. 6 operate normally (e.g., without failure). FIGS. 9 and 10 are diagrams explaining sensing results according to an example embodiment of the present invention when a short circuit has occurred between both ends (an anode and a cathode) of the organic light emitting diode included in the subpixel of FIG. 6. FIGS. 11 and 12 are diagrams explaining sensing results according to an example embodiment of the present invention when a short circuit has occurred between gate and source electrodes of the driving transistor included in the subpixel of FIG. 6.

As shown in FIGS. 7 and 8, a first experimental example (Test 1) and a second experimental example (Test 2) correspond to situations in which the elements included in the subpixel operate normally (e.g., without failure). The first experimental example (Test 1) and the second experimental example (Test 2) show results obtained after sensing current flowing through the second driving voltage line EVSS during a current sensing period after operation under the following conditions.

<Driving Conditions of First Experimental Example (Test 1)>

(1) Application of a first experimental driving voltage EVDD (for example, 0V) through the first driving voltage line EVDD;

(2) Application of a second driving voltage EVSS (for example, 0V) through the second driving voltage line EVSS;

(3) Application of an experimental scan signal Scan through the first gate line GL1; and (4) Application of an experimental data voltage Vdata (for example, 6V) through the first data line DL1.

<Driving Conditions of Second Experimental Example (Test 2)>

(1) Application of a third experimental driving voltage EVDD (for example, 6V) through the first driving voltage line EVDD;

(2) Application of the second driving voltage EVSS (for example, 0V) through the second driving voltage line EVSS;

(3) Application of the experimental scan signal Scan through the first gate line GL1; and (4) Application of the experimental data voltage Vdata (for example, 6V) through the first data line DL1.

As can be seen from current sensing results (Current@EVSS) of the first experimental example (Test 1) and the second experimental example (Test 2), current flowing through the second driving voltage line EVSS may not be detected when the elements operate normally (e.g., the current sensed on EVSS remains a logical low or no current sensed).

In the first experimental example (Test 1), this can be explained as a state in which no current flow is generated because the first experimental example (Test 1) establishes a condition that there is no potential difference between the two voltage lines. In the second experimental example (Test 2), this can be explained as a state in which no current flow is generated because the resistance of the organic light emitting diode OLED is high, even though the second experimental example (Test 2) establishes a condition that there is a potential difference between the two voltage lines. Thus, showing that the subpixel circuit is operating normally and does not have a short circuit condition.

Driving conditions of third to sixth experimental examples (Test 3 to Test 6), which will be described hereinafter, are identical to those of the first experimental example (Test 1) and the second experimental example (Test 2) and, as such, only sensing results thereof will be described.

As can be seen from current sensing results (Current@EVSS) of the third experimental example (Test 3) and the fourth experimental example (Test 4) as shown in FIGS. 9 and 10, current flowing through the second driving voltage line EVSS can be detected only under the condition that the third experimental driving voltage EVDD (for example, 6V) is applied, even when a short circuit has occurred between both ends of the organic light emitting diode.

In the third experimental example (Test 3), this can be explained as a state in which no current flow is generated because the third experimental example (Test 3) establishes a condition that there is no potential difference between the two voltage lines, and 0V is applied as a drain-source voltage of the driving transistor DT. In the fourth experimental example (Test 4), this can be explained as a state in which current flow is generated because the fourth experimental example (Test 4) establishes a condition that there is a potential difference between the two voltage lines, and 6V is applied as a drain-source voltage of the driving transistor DT.

As can be seen from current sensing results (Current@EVSS) of the fifth experimental example (Test 5) and the sixth experimental example (Test 6) as shown in FIGS. 11 and 12, current flowing through the second driving voltage line EVSS can be detected when a short has occurred between the gate and source electrodes of the driving transistor, even though the first experimental driving voltage EVDD (for example, 0V) or the third experimental driving voltage EVDD (for example, 6V) is applied. Thus, showing that the subpixel circuit is not operating normally and has a short circuit condition.

In the fifth experimental example (Test 5) and the sixth experimental example (Test 6), this can be explained as a state in which current flow according to the experimental data voltages Vdata (for example, 0V and 6V) is generated due to a short between the gate and source electrodes of the driving transistor DT, irrespective of whether or not an experimental driving voltage is applied.

Figure 13:
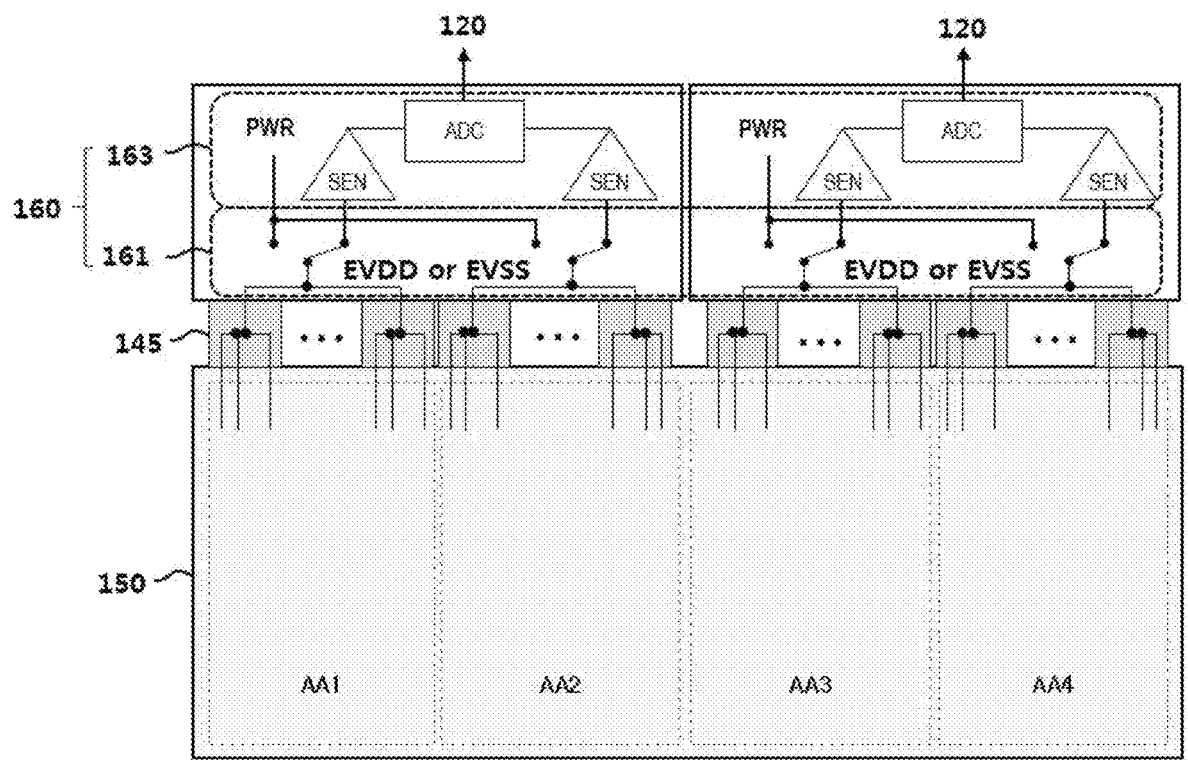
FIG. 13 is a diagram schematically showing a subpixel failure sensing circuit according to an embodiment of the present invention.
Figure 14:
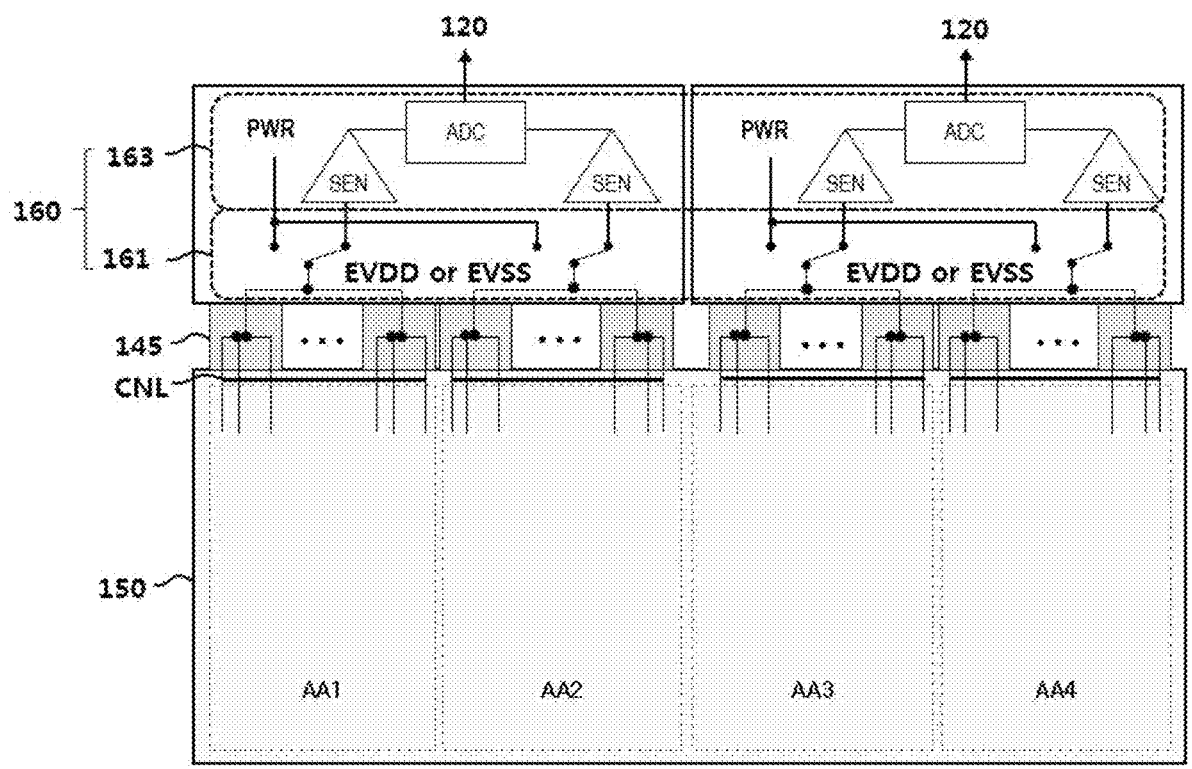
FIGS. 14 to 16 are diagrams explaining a configuration capable of being taken into consideration as a scheme for enhancing sensing accuracy according to embodiments of the present invention.
Figure 15:
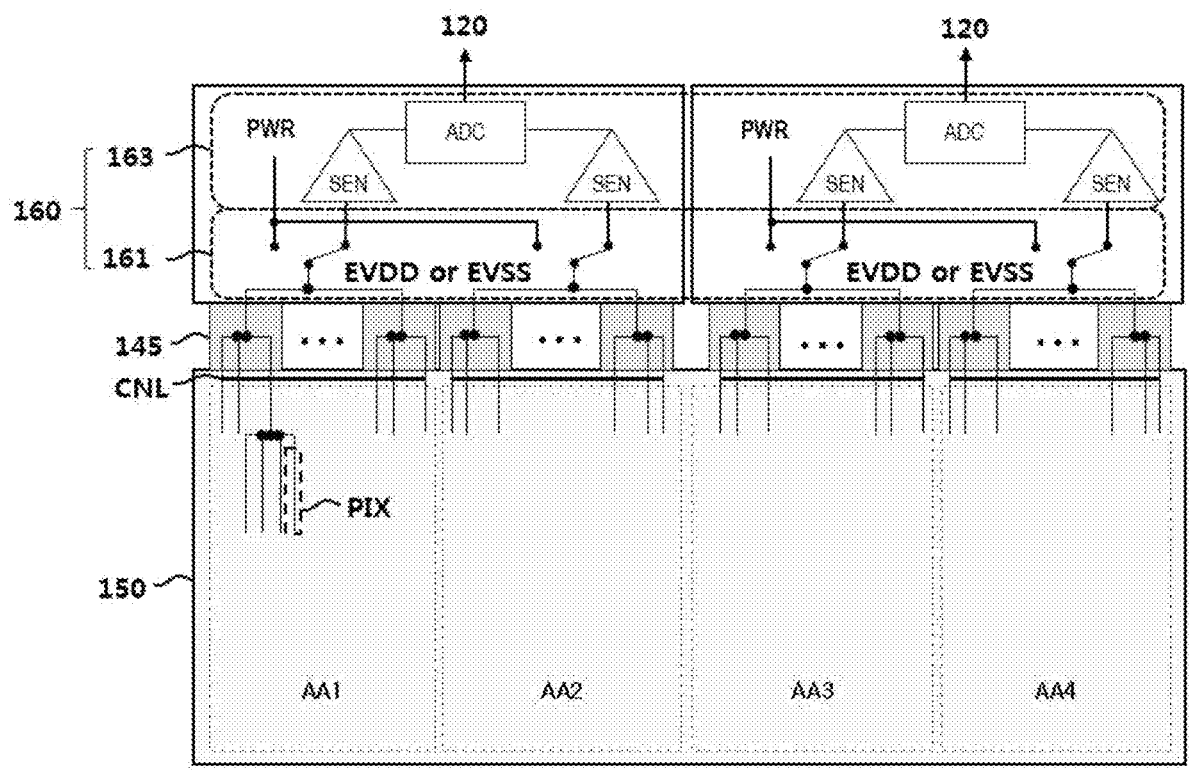
Figure 16:
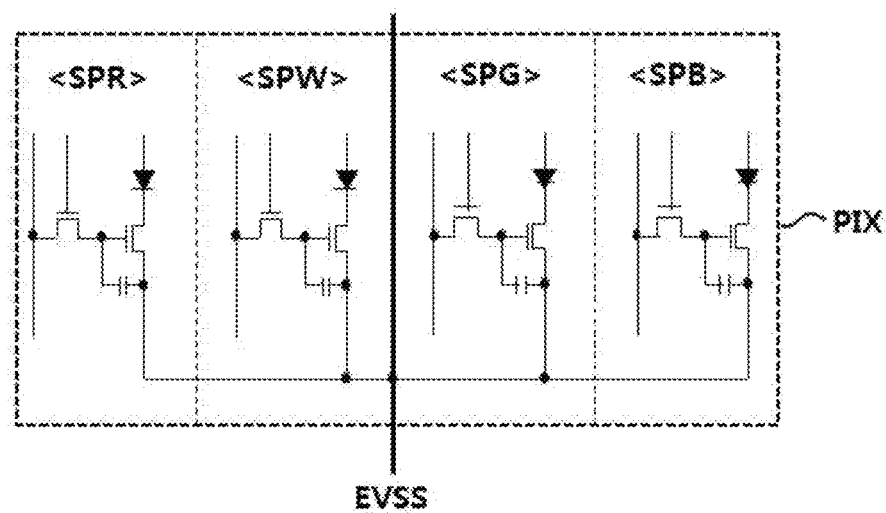

FIG. 13 is a diagram schematically showing a subpixel failure sensing unit according to an example embodiment of the present invention. FIGS. 14 to 16 are diagrams explaining a configuration capable of being taken into consideration as a scheme for enhancing sensing accuracy according to an embodiment of the present invention.

As shown in FIG. 13, the subpixel failure sensing unit (defect sensing circuit) according to the example embodiment of the present invention, which is designated by reference numeral "160," can include a sensing circuit unit 163 configured to sense whether or not there is failure in the subpixel, through a driving voltage line EVDD or EVSS, a switch circuit unit 161 configured to interconnect the driving voltage line EVDD or EVSS and the sensing circuit unit 163, etc.

The sensing circuit unit 163 can include a first sensing circuit unit SEN configured to sense whether or not there is failure in the subpixel, through the driving voltage line EVDD or EVSS, and a second sensing circuit unit ADC configured to convert a sensing value having an analog form output from the first sensing circuit unit SEN into a sensing value having a digital form, and to transmit the converted sensing value to a timing controller 120. The timing controller 120 can analyze the sensing value having the digital form and, as such, can determine whether there is failure of an element included in the subpixel subjected to sensing, when the sensing value is not smaller than a predetermined value (this is because there can be noise, etc.). For example, if the sensing value sensed from the driving voltage line EVDD or EVSS is greater than the predetermined value, then a fault within the subpixel can be detected and identified.

The switch circuit unit 161 can include a plurality of switches configured to connect the driving voltage line EVDD or EVSS to an input stage of the first sensing circuit unit SEN of the sensing circuit unit 163 or to connect the driving voltage line EVDD or EVSS to a driving voltage source PWR.

The sensing circuit unit 163 and the switch circuit unit 161 can be implemented on a printed circuit board, or at least one thereof can take the form of an integrated circuit (IC) and, as such, can be implemented to be mounted on a printed circuit board.

The subpixel failure sensing unit 160 can be electrically connected to the driving voltage line EVDD or EVSS, which is disposed on a flexible circuit board 145 electrically connected to a display panel 150. As described above, the driving voltage line EVDD or EVSS on the flexible circuit board 145 can be electrically connected to the switch circuit unit 161.

When the display panel 150 is divided into a first display area AA1, a second display area AA2, a third display area AA3, and a fourth display area AA4, the first sensing circuit unit SEN of the sensing circuit unit 163 can be implemented to be four in number (e.g., four sensing circuit units corresponding to the four areas of the display panel), and the switches included in the switch circuit unit 161 can be implemented to be four in number (e.g., four switches corresponding to the four sensing circuit units). In addition, the driving voltage line EVDD or EVSS can be implemented to be divided into four lines disposed to be electrically separated from one another, corresponding to the four divided display areas AA1 to AA4. That is, each of the number of first sensing circuit units SEN of the sensing circuit unit 163, the number of the switches included in the switch circuit unit 161, and the number of the divided display areas in the display panel 150 can be N (N being an integer of 2 or greater). The numbers of elements and lines as described above are only illustrative and, as such, the example embodiments of the present invention are not limited thereto.

As shown in FIG. 14, the display panel 150 can include a voltage line connector CNL (e.g., represented as a thick horizontal line in FIG. 14) configured to interconnect a plurality of divided driving voltage lines EVDD or EVSS in common. When the driving voltage lines EVDD or EVSS are disposed to extend in the vertical direction, the voltage line connector CNL can be disposed to extend in the horizontal direction in order to interconnect the driving voltage lines EVDD or EVSS in common under the condition that the driving voltage lines EVDD or EVSS are divided in accordance with respective display areas AA1 to AA4.

When the driving voltage lines EVDD or EVSS disposed in respective areas AA1 to AA4 in a divided manner are interconnected in common, based on the configuration of the voltage line connector CNL, it can be possible to reduce an IR drop or voltage drop and, as such, enhance sensing accuracy. For this purpose, the voltage line connector CNL can have a greater linewidth than the driving voltage lines EVDD or EVSS (e.g., the voltage line connector CNL can be wider or thicker than the driving voltage lines EVDD or EVSS). In addition, the driving voltage lines EVDD or EVSS disposed in respective display areas AA1 to AA4 can be disposed in the form of a mesh.

Meanwhile, although the voltage line connector CNL is illustrated in FIG. 14 as being disposed in an upper non-display area between the flexible circuit board 145 and the first to fourth display areas AA1 to AA4, the example embodiments of the present invention are not limited thereto.

As shown in FIG. 15, subpixels PIX adjacent to one another in the vertical direction can be configured to be connected to a plurality of driving voltage lines EVDD or EVSS divided, corresponding to respective display areas AA1 to AA4, and disposed to extend in the vertical direction. FIG. 16 is a diagram showing, in more detail, a configuration of one pixel PIX connected to one second driving voltage line EVSS shown in FIG. 15. A red subpixel SPR, a white subpixel SPW, a green subpixel SPG and a blue subpixel SPB constituting one pixel PIX can share one driving voltage line EVDD or EVSS.

Meanwhile, although one pixel PIX is illustrated in FIG. 16 as being constituted by the red subpixel SPR, the white subpixel SPW, the green subpixel SPG and the blue subpixel SPB, the example embodiments of the present invention are not limited thereto.

Figure 17:
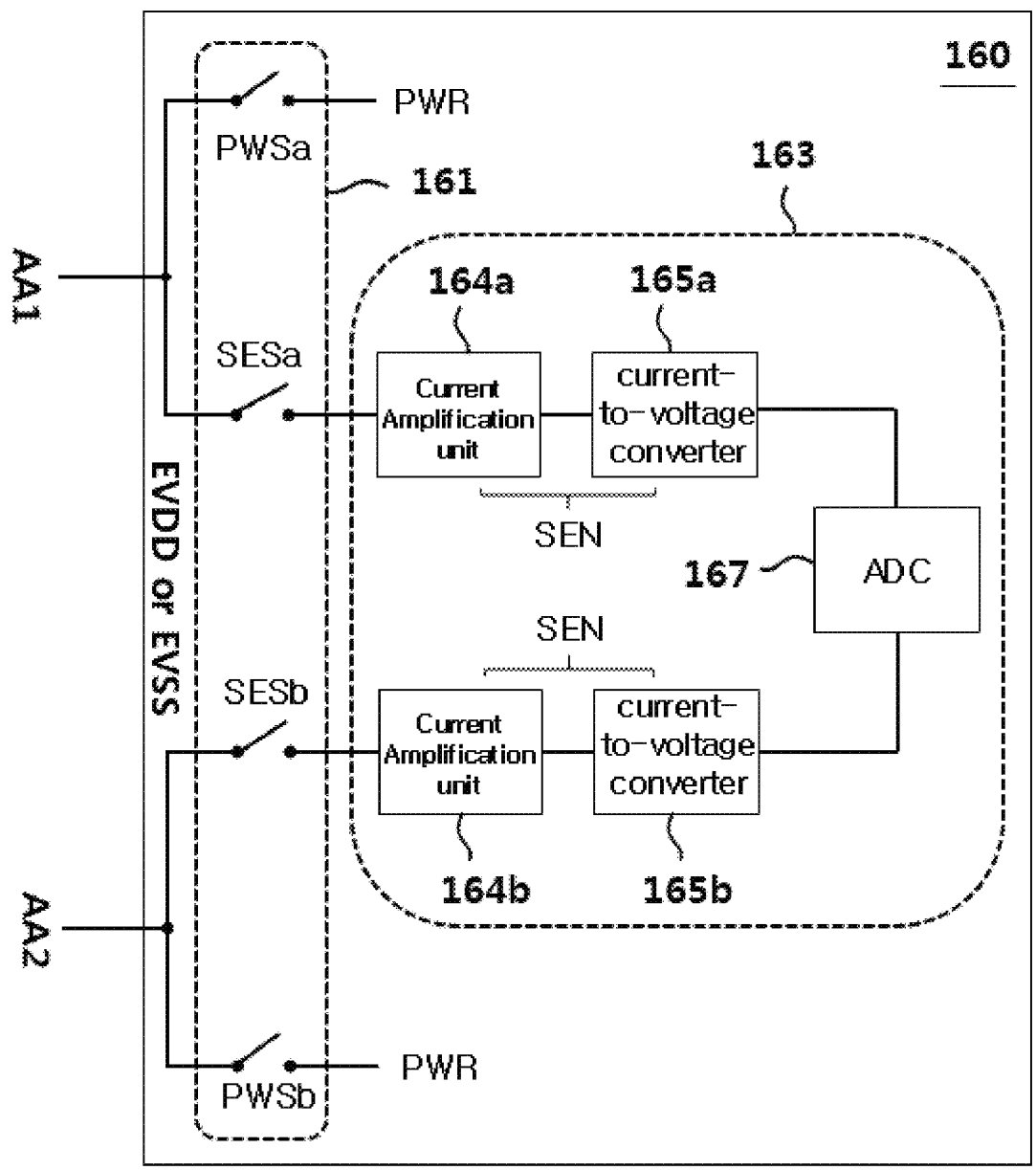
FIGS. 17 and 18 are diagrams schematically illustrating internal configurations of subpixel failure sensing circuits according to embodiments of the present invention.
Figure 18:
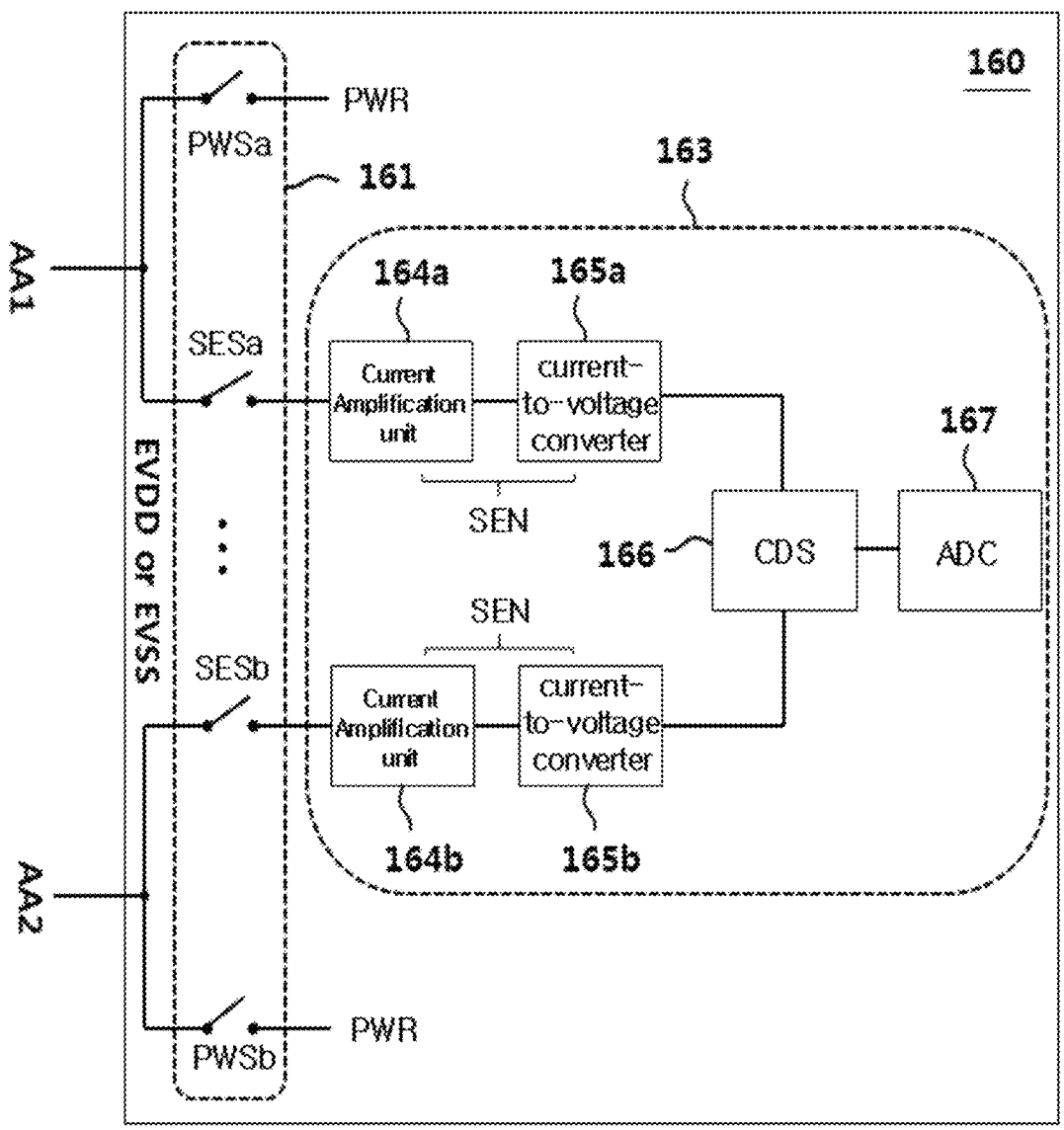

FIGS. 17 and 18 are diagrams schematically illustrating internal configurations of subpixel failure sensing units according to example embodiments of the present invention.

As shown in FIG. 17, a sensing circuit unit 163 can include a first sensing circuit unit SEN and a second sensing circuit unit 167 (ADC). The first sensing circuit unit SEN can include a plurality of current amplification units (circuits) 164a and 164b and a plurality of current-to-voltage converters 165a and 165b. The second sensing circuit unit 167 can include an analog-to-digital converter ADC configured to convert an analog signal into a digital signal and to output the digital signal.

The first current amplification unit 164a and the second current amplification unit 164b can function to amplify a first sensing current value and a second sensing current value sensed through a driving voltage line EVDD or EVSS of a first display area AA1 and a driving voltage line EVDD or EVSS of a second display area AA2, respectively, and to output the amplified first and second sensing current values, respectively.

The first current-to-voltage converter 165a and the second current-to-voltage converter 165b can function to convert the amplified first sensing current value and the amplified second sensing current value output from the first current amplification unit 164a and the second current amplification unit 164b into a first sensing voltage value and a second sensing voltage value, respectively, and to output the first sensing voltage value and the second sensing voltage value, respectively.

The first current-to-voltage converter 165a and the second current-to-voltage converter 165b can transmit the first sensing voltage value and the second sensing voltage value to the second sensing circuit unit 167 (ADC). In order to amplify a sensing current amount, however, the sensing circuit unit 163 can further include a noise removal unit (circuit) 166 (CDS) configured to remove a noise component possibly generated during a sensing operation of the first sensing circuit unit SEN, as shown in FIG. 18. For example, the subpixel failure sensing unit 160 shown in FIG. 18 is similar to FIG. 17, but further includes the noise removal unit (circuit) 166 (CDS). In this situation, the first sensing voltage value and the second sensing voltage value output from the first current-to-voltage converter 165a and the second current-to-voltage converter 165b can be input to the second sensing circuit unit 167 (ADC) after removal of a noise component therefrom, which can further enhance accuracy.

Meanwhile, a noise component corresponding to a volume of a load tied to each sensing circuit unit can be generated. In addition, when a noise component is output, sensing accuracy can be degraded. Accordingly, when the noise removal unit 166 is added, it can be possible to achieve data extraction capable of further enhancing the determination capability as to whether or not there is a failure, as well as accurate sensing.

A switch circuit unit 161 can include a plurality of voltage supply switches PWSa and PWSb configured to be turned on during a driving period, for supply of a driving voltage, and a plurality of sensing activation switches SESa and SESb configured to be turned on during a failure sensing period, for activation of sensing. Meanwhile, maximum current that can be generated at one driving voltage line during the driving period corresponds to a level of about several tens of mA. Accordingly, switches configured to distinguish the driving period and the sensing period from each other are used in order to not only achieve an enhancement in driving performance, but also to achieve an enhancement in sensing accuracy.

The first voltage supply switch PWSa can function to electrically interconnect the driving voltage line EVDD or EVSS disposed in the first display area AA1 of the display panel and the driving voltage source PWR. Similarly, the second voltage supply switch PWSb can function to electrically interconnect the driving voltage line EVDD or EVSS disposed in the second display area AA2 of the display panel and the driving voltage source PWR.

The first sensing activation switch SESa can function to electrically interconnect the driving voltage line EVDD or EVSS disposed in the first display area AA1 of the display panel and the input stage of the first current amplification unit 164a. Similarly, the second sensing activation switch SESb can function to electrically interconnect the driving voltage line EVDD or EVSS disposed in the second display area AA2 of the display panel and the input stage of the second current amplification unit 164b.

Figure 19:
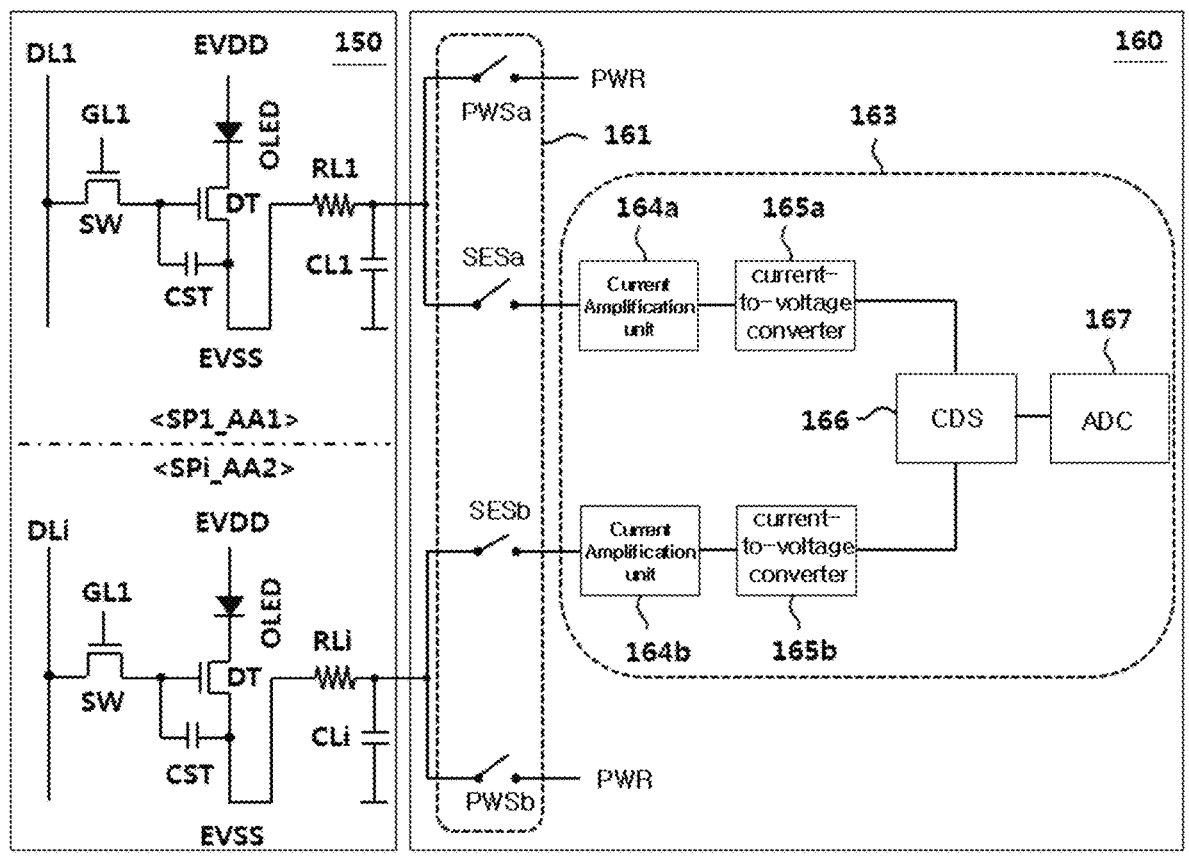
FIGS. 19 and 20 are diagrams showing a failure detection method using the subpixel failure sensing circuit shown in FIG. 18 in accordance with an embodiment of the present invention.
Figure 20:
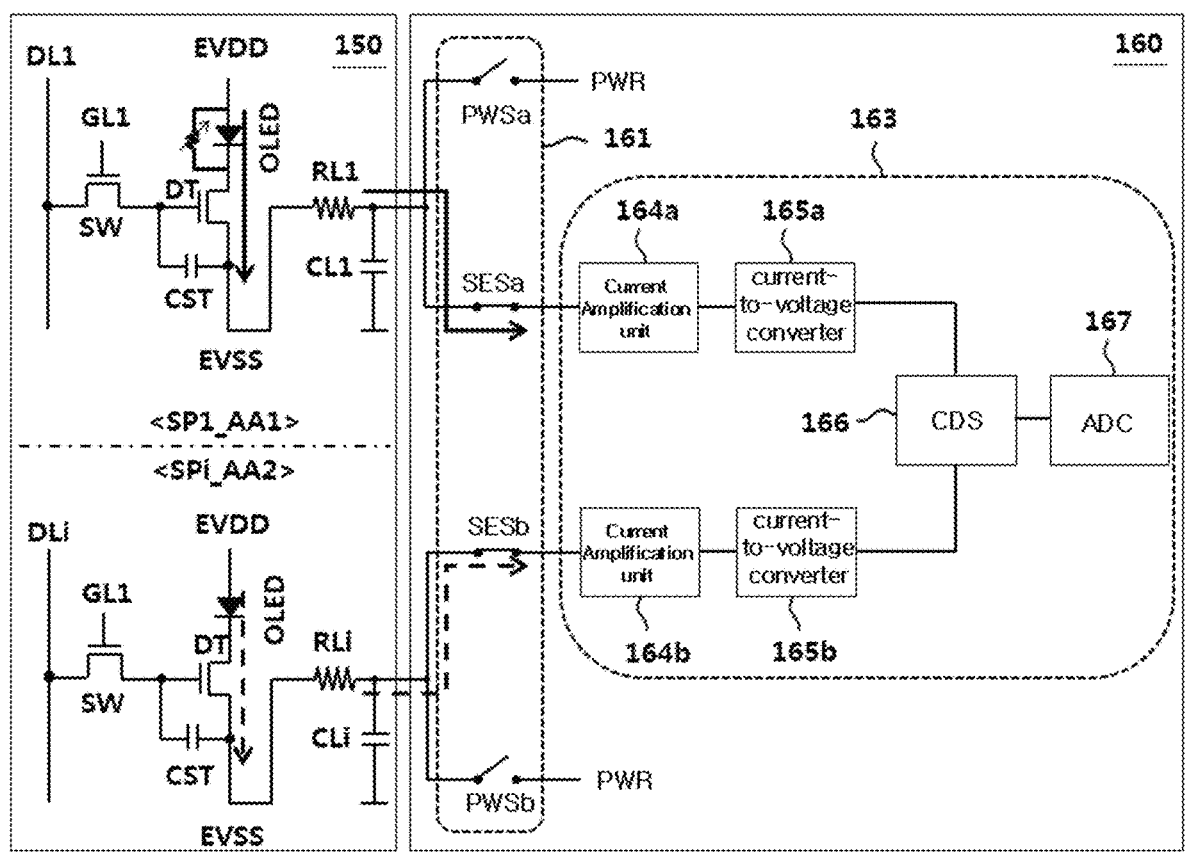

FIGS. 19 and 20 are diagrams showing a failure detection method using the subpixel failure sensing unit shown in FIG. 18 in accordance with an example embodiment of the present invention. For convenience of description, the following description will be given in conjunction with an example in which two subpixels disposed in two display areas are sensed. However, it is noted that the unit of sensing is at least two subpixels, at least two pixels, or at least two blocks including many pixels.

As shown in FIG. 19, the subpixel failure sensing unit 160 according to the example embodiment of the present invention can sense a second driving voltage line EVSS of a first subpixel SP1_AA1 of a first display area and a second driving voltage line EVSS of an i-th subpixel SPi_AA2 of a second display area. In FIG. 19, "RL1" and "RLi," and "CL1" and "CLi" can be parasitic resistances and parasitic capacitances present on the first subpixel SP1_AA1 of the first display area and the i-th subpixel SPi_AA2 of the second display area, respectively.

Although the first subpixel SP1_AA1 of the first display area and the i-th subpixel SPi_AA2 of the second display area are disposed in different areas, respectively, these subpixels can be subpixels disposed at the same scan line (or the same horizontal line).

As shown in FIG. 20, the first sensing activation switch SESa and the second sensing activation switch SESb can be turned on (e.g., closed) in order to sense the second driving voltage line EVSS of the first subpixel SP1_AA1 of the first display area and the second driving voltage line EVSS of the i-th subpixel SPi_AA2 of the second display area. In this state, the first voltage supply switch PWSa and the second voltage supply switch PWSb can be in a turned-off state (e.g., opened).

For sensing for the first subpixel SP1_AA1 of the first display area and the i-th subpixel SPi_AA2 of the second display area, voltages and signals can be applied under the driving conditions described with reference to FIG. 8, etc. When elements included in the first subpixel SP AA1 of the first display area and the i-th subpixel SPi_AA2 of the second display area operate normally, current flowing through the second driving voltage line EVSS may not be detected (e.g., the sensed current should be zero or nearly zero, or a logical low when the subpixels are operating normally).

However, when a short has occurred between both ends (an anode and a cathode) of an organic light emitting diode OLED included in the first subpixel SP1_AA1 of the first display area, current flowing through the second driving voltage line EVSS can be detected. In this situation, a current value sensed from the i-th subpixel SPi_AA2 of the second display area can be used as a reference for removal of a noise component.

Figure 21:
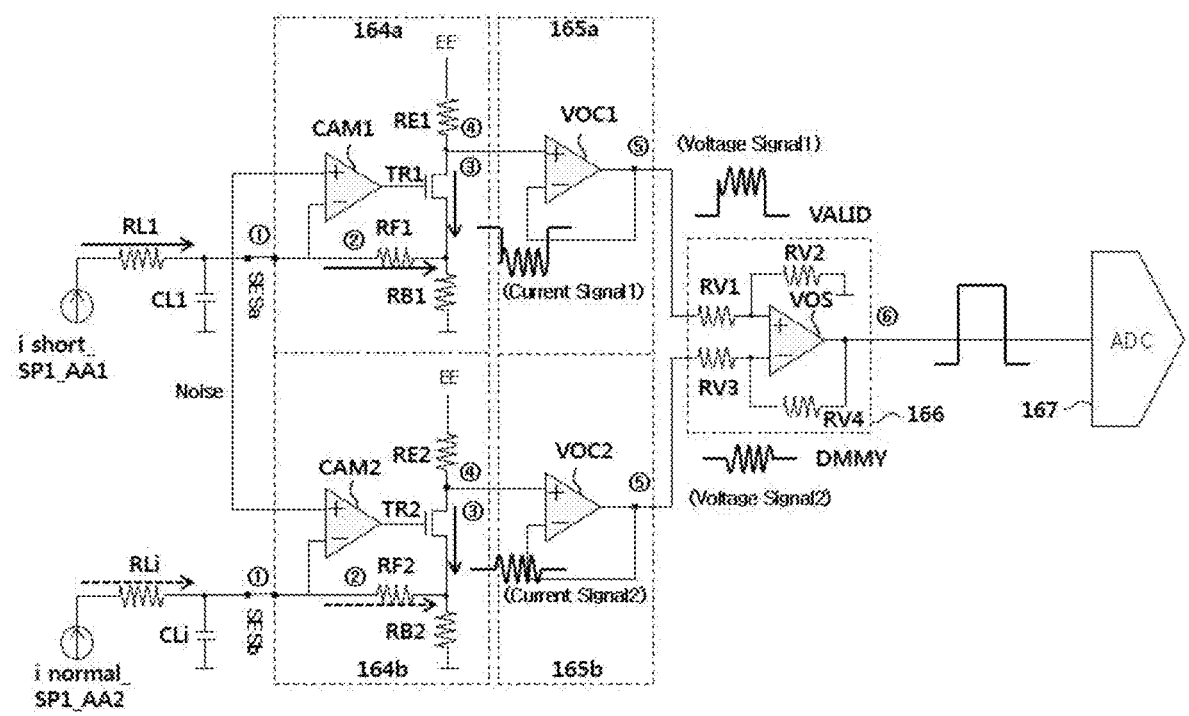
FIG. 21 is a diagram illustrating, in more detail, an internal configuration of the subpixel failure sensing circuit according to an embodiment of the present invention.
Figure 22:
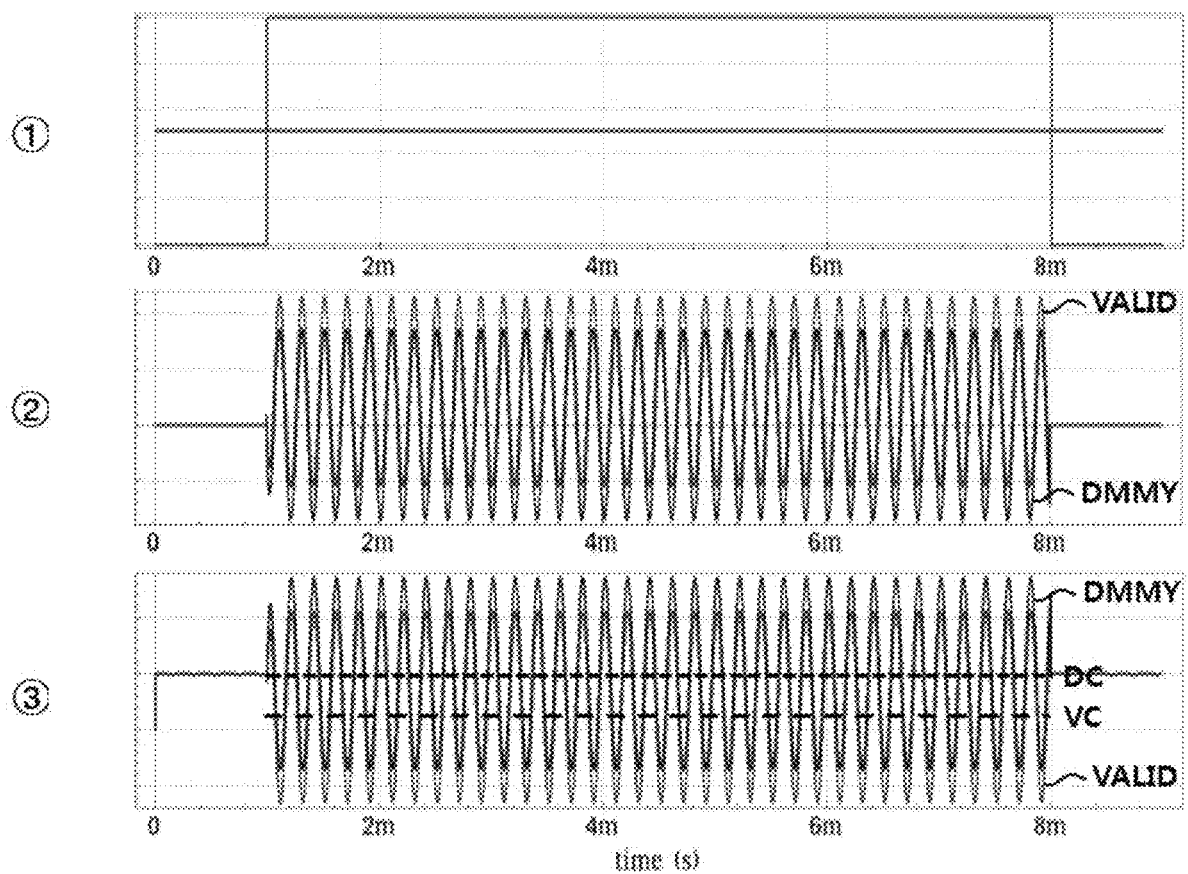
FIGS. 22 and 23 are diagrams showing results of a failure sensing simulation using the configuration of FIG. 21 according to embodiments of the present invention.
Figure 23:
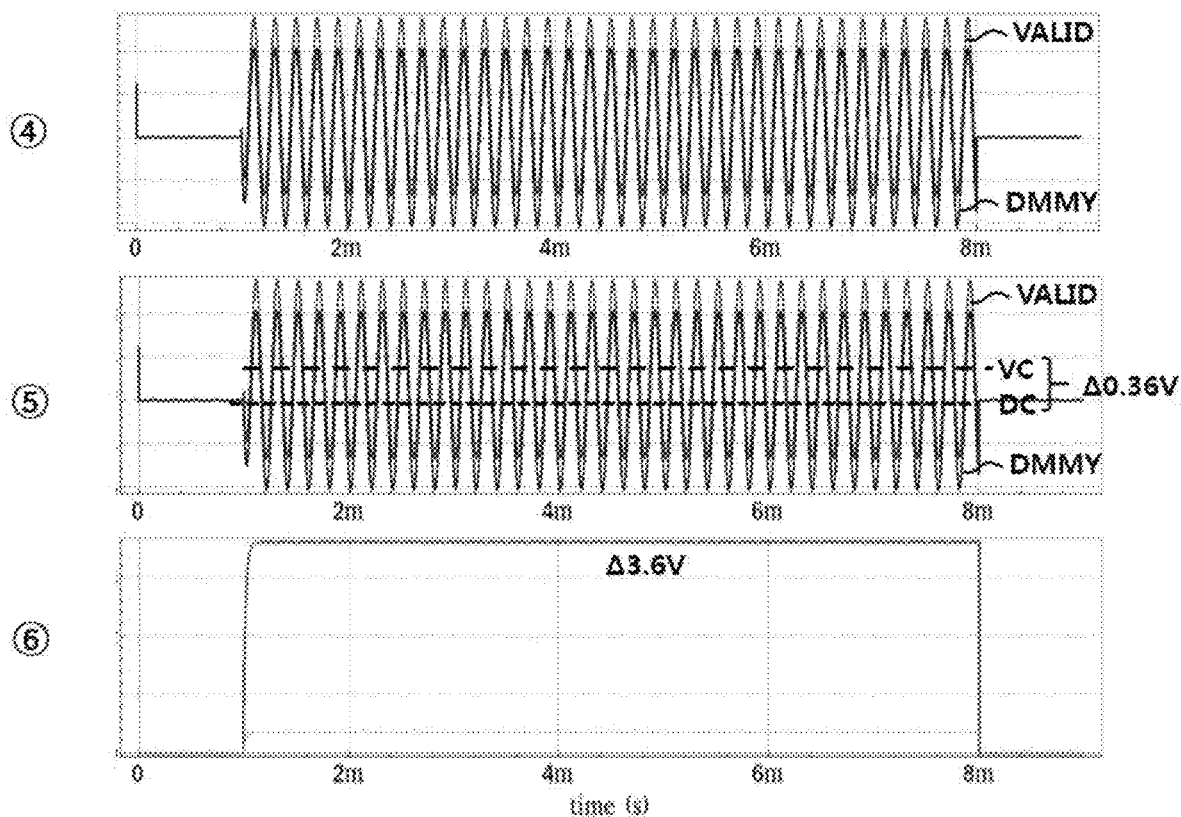

FIG. 21 is a diagram illustrating, in more detail, an internal configuration of the subpixel failure sensing unit according to an example embodiment of the present invention. FIGS. 22 and 23 are diagrams showing results of a failure sensing simulation using the configuration of FIG. 21.

As shown in FIG. 21, the first current amplification unit 164a and the second current amplification unit 164b can include current amplifiers CAM1 and CAM2 configured to amplify a sensed first sensing current value and a sensed second sensing current value and to output the amplified values. Hereinafter, the configuration of, for example, the first current amplification unit 164a, will be described.

The first amplifier CAM 1 can be connected, at an inverting terminal (−) thereof, to one end of the first sensing activation switch SESa while being connected, at a non-inverting terminal (+) thereof, to a non-inverting terminal (+) of the second amplifier CAM2 and connected, at an output terminal thereof, to a gate electrode of a first transistor TR1, in order to obtain a sensed sensing current value. A first-side resistor RE1 can be connected, at one end thereof, to a high voltage stage EE while being connected, at the other end thereof, to a first electrode of the first transistor TR1. A second-side resistor RB1 can be connected, at one end thereof, to a low voltage stage while being connected, at the other end thereof, to a second electrode of the first transistor TR1. A first feedback resistor RF1 can be connected, at one end thereof, to the inverting terminal (−) of the first amplifier CAM1 and one end of the first sensing activation switch SESa while being connected, at the other end thereof, to the second electrode of the first transistor TR1 and the one end of the second-side resistor RB1.

The first current-to-voltage conversion unit 165a and the second current-to-voltage conversion unit 165b can include current-to-voltage converters VOC1 and VOC2 configured to convert the first sensing current value and the second sensing current value into a first sensing voltage value and a second sensing voltage value and to output the first sensing voltage value and the second sensing voltage value, respectively. Hereinafter, the configuration of, for example, the first current-to-voltage conversion unit 165a, will be described.

The first current-to-voltage converter VOC1 can be connected, at a non-inverting terminal (+) thereof, to a node, at which the first-side resistor RE1 of the first current amplification unit 164a and the first electrode of the first transistor TR1 are interconnected, while being connected, at an inverting terminal (−) thereof, to an output terminal thereof.

The noise removal unit 166 can include a differential amplifier VOS, etc. in order to remove noise components of the first sensing voltage value and the second sensing voltage value output from the first current-to-voltage conversion unit 165a and the second current-to-voltage conversion unit 165b.

A first resistor RV1 can be connected, at one end thereof, to the output terminal of the first current-to-voltage converter VOC1 while being connected, at the other end thereof, to a non-inverting terminal (+) of the differential amplifier VOS. A second resistor RV2 can be connected, at one end thereof, to the non-inverting terminal (+) of the differential amplifier VOS while being connected, at the other end thereof, to a reference voltage source. A third resistor RV3 can be connected, at one end thereof, to an output terminal of the second current-to-voltage converter VOC2 while being connected, at the other end thereof, to an inverting terminal (−) of the differential amplifier VOS. A fourth resistor RV4 can be connected, at one end thereof, to the inverting terminal (−) of the differential amplifier VOS while being connected, at the other end thereof, to an output terminal of the differential amplifier VOS. The differential amplifier VOS can be connected, at the non-inverting terminal (+) thereof, to the other end of the first resistor RV1 and the one end of the second resistor RV2 while being connected, at the inverting terminal (−) thereof, to the other end of the third resistor RV3 and the one end of the fourth resistor RV4 and connected, at the output terminal thereof, to an input stage of the second sensing circuit unit 167 (ADC).

The subpixel failure sensing unit 160 according to the example embodiment of the present invention can sense only a subpixel of a particular display area, based on driving conditions thereof and on/off control of the sensing activation switches. In order to enhance sensing accuracy, however, it can be possible to simultaneously sense at least two subpixels and to use one of the subpixels as a reference. In the embodiment of FIG. 21, accordingly, a first sensing current value i short_SP1_AA1 sensed through the first subpixel SP1_AA1 of the first display area can be defined as valid data for determination as to whether or not subpixel failure has occurred. In addition, a second sensing current value i normal_SP1_AAi sensed through the i-th subpixel SPi_AA2 of the second display area can be defined as dummy data (or invalid data) to be used as a reference.

In FIG. 22, ① represents a signal for controlling the first and second sensing activation switches SESa and SESb shown in FIG. 21. Since an activation signal of logic high is being applied, the first and second sensing activation switches SESa and SESb are in a turned-on state (e.g., a closed state).

In FIG. 22, ② represents a first sensing current value and a second sensing current value transmitted (sensed) through the first and second feedback resistors RF1 and RF2 shown in FIG. 21. Each of the first sensing current value and the second sensing current value is in a state in which noise according to a ratio between a line load and a load in the sensing circuit is mixed with the sensing current value. In FIG. 22, valid data VALID is the first sensing current value i short_SP1_AA1 sensed through the first subpixel SP1_AA1 of the first display area, and dummy data DMMY is the second sensing current value i normal_SP1_AAi sensed through the i-th subpixel SPi_AA2 of the second display area. For example, ② in FIG. 22 can correspond to the situation in which input short current is generated. In this situation, the first sensing current value VALID can be sensed to be "3 µA+noise," whereas the second sensing current value DMMY can be sensed to be "0 µA+noise."

In FIG. 22, ③ represents a first sensing current value and a second sensing current value amplified through driving of the first and second transistors TR1 and TR2 of the first current amplification unit 164a and the second current amplification unit 164b. Meanwhile, the effective data VALID has a current value and a noise value (e.g., a bias and a noise component), whereas the dummy data DMMY only has a noise value (e.g., just a noise component). Accordingly, it can be seen that there is a difference between a central value VC of the valid data VALID and a central value DC of the dummy data DMMY. For example, ③ in FIG. 22 can correspond to output current in a state in which a gain value of 2 is applied to the current amplification units 164a and 164b (Δ can be 6 µA when the gain value of 2 is applied). In this situation, when a central value DC of initial current is 50 µA, the first sensing current value VALID can be sensed to be "50 µA−2 µA*3 µA=44 µA," and the second sensing current value DMMY can be sensed to be "50 µA−20 µA*0 µA=50 µA."

In FIG. 23, ④ represents a first sensing current value and a second sensing current value output from output terminals (or output nodes) of the first current amplification unit 164a and the second current amplification unit 164b shown in FIG. 21.

In FIG. 23, ⑤ represents a first sensing voltage value and a second sensing voltage value output from output terminals (or output nodes) of the first current-to-voltage conversion unit 165a and the second current-to-voltage conversion unit 165b shown in FIG. 21.

In FIG. 23, ⑥ represents a sensing voltage value output from an output terminal of the noise removal unit 166 shown in FIG. 21. Only a sensing voltage value, which is a difference value between the valid data VALID, that is, the first sensing voltage value, and the dummy data DMMY, that is, the second sensing voltage value, is output by the noise removal unit 166. In this situation, the noise removal unit 166 may not only remove noise by deducting the second sensing voltage value from the first sensing voltage value (or vice versa), but also can enhance an output (e.g., amplify the output), as compared to an input, through application of a particular gain (e.g., a gain of 10), thereby enhancing discrimination capability for sensing values. That is, the noise removal unit 166 can calculate a difference value between the valid data VALID, that is, the first sensing voltage value, and the dummy data DMMY, that is, the second sensing voltage value, can amplify the calculated value, and can output the amplified value. Here, ⓒ in FIG. 23 illustrates that Δ of 3.6 can be obtained when a gain value of 10 is applied to the sensing voltage value output from the output terminal of the noise removal unit 166.

Figure 24:
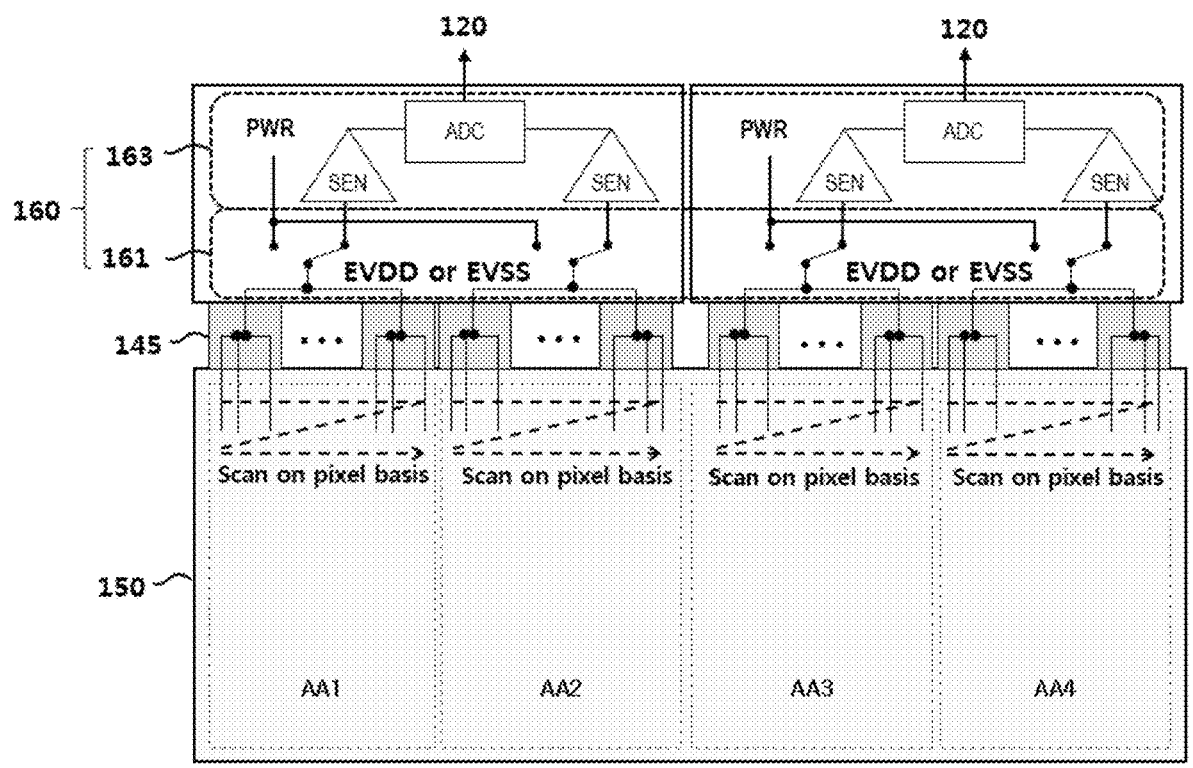
FIGS. 24 and 25 are diagrams explaining a method for detecting failure in a scanning manner on a pixel basis, according to an embodiment of the present invention.
Figure 25:
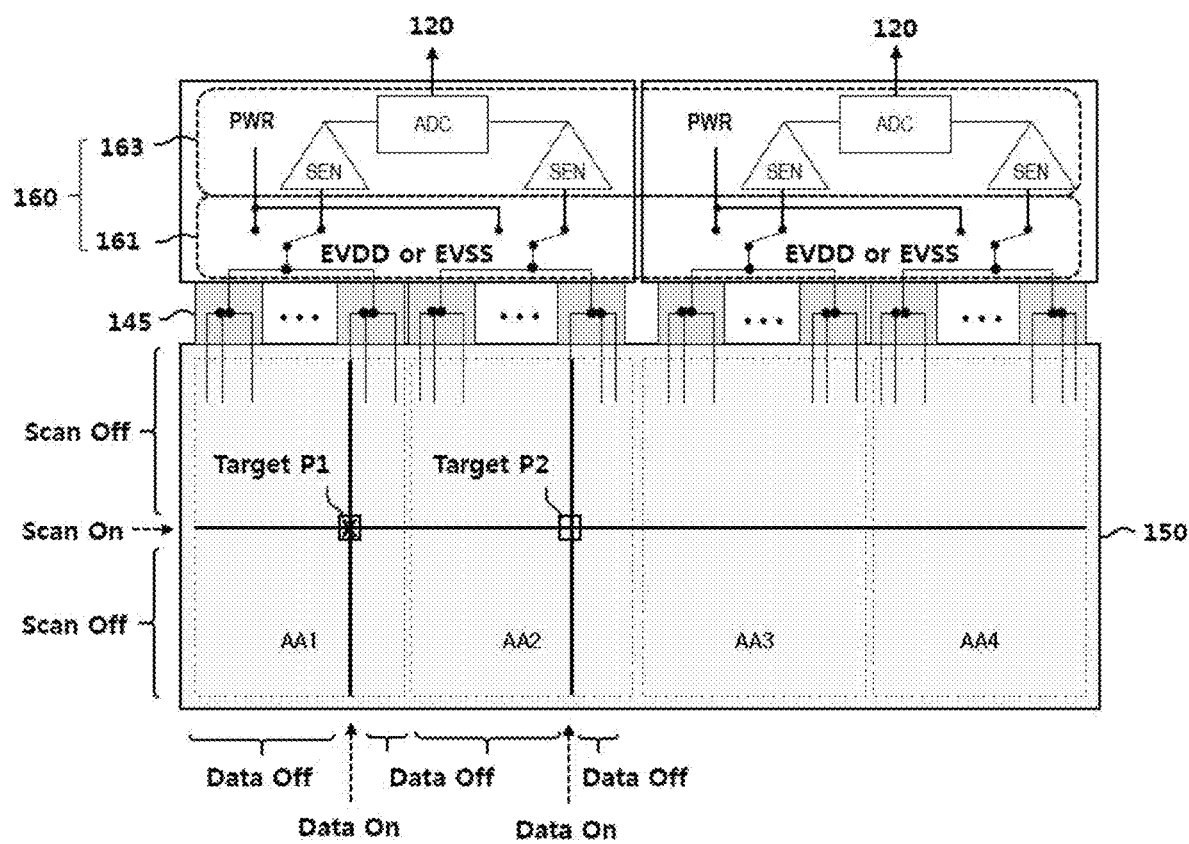
Figure 26:
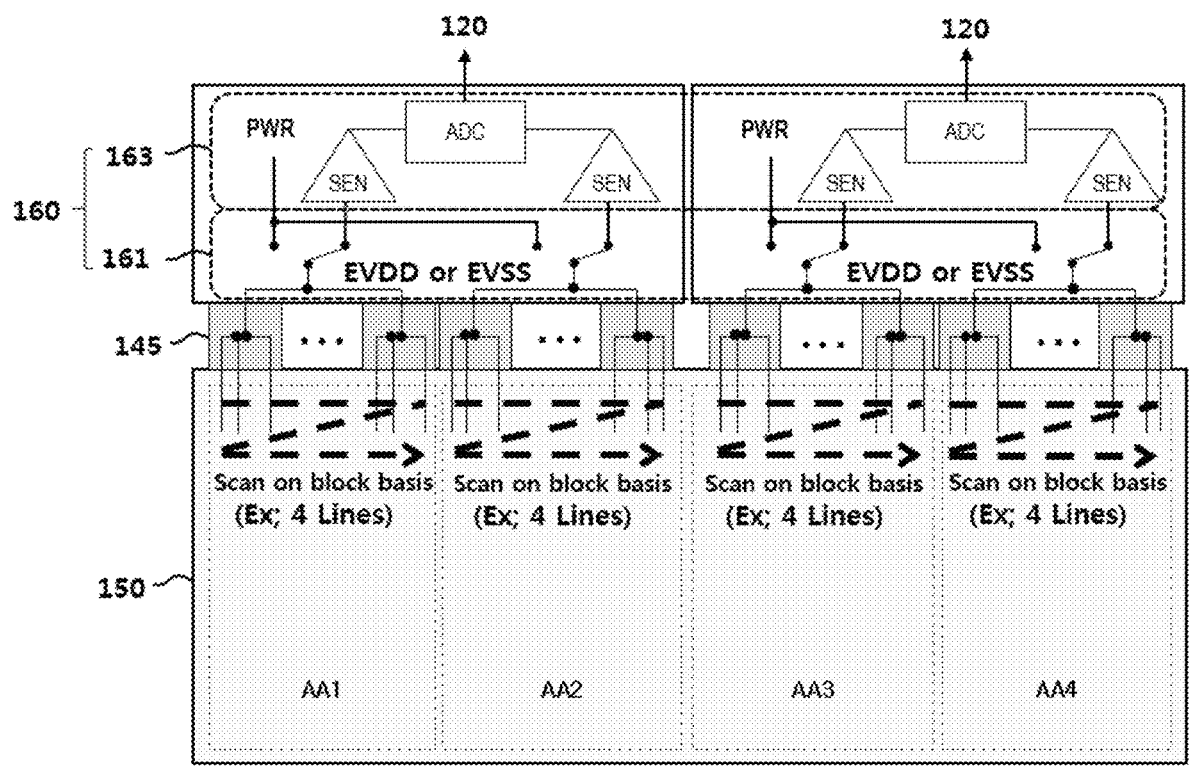
FIGS. 26 and 27 are diagrams explaining a method for detecting failure in a scanning manner on a block basis, according to an embodiment of the present invention.
Figure 27:
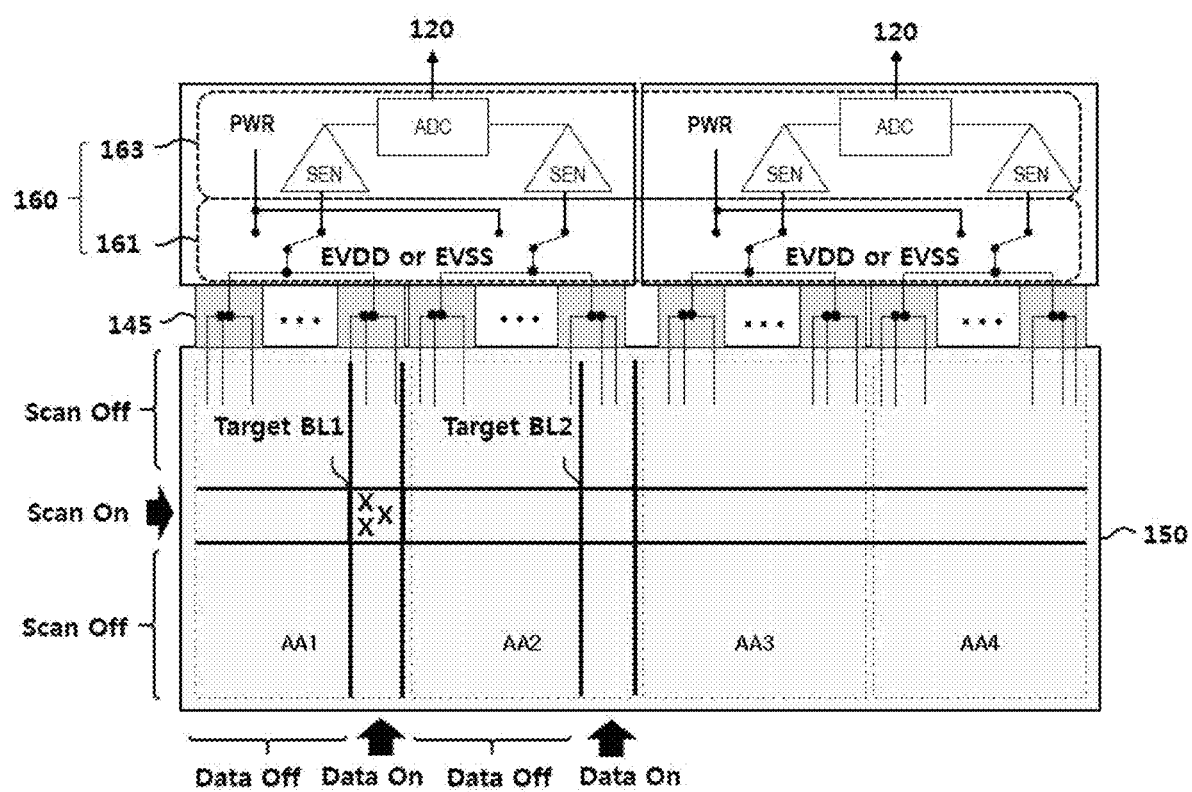
Figure 28:
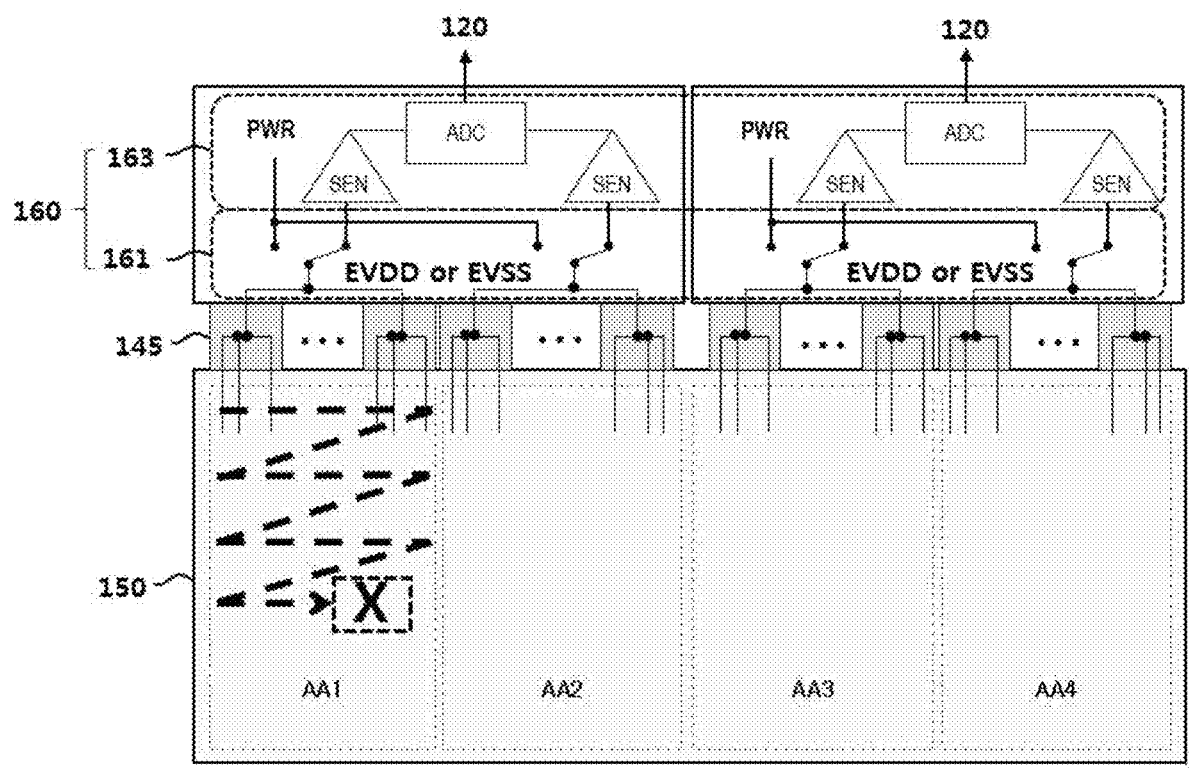
FIGS. 28 to 30 are diagrams explaining a block size and the number of sensing times in each step when a scanning method on a block basis is used according to an embodiment of the present invention.
Figure 29:
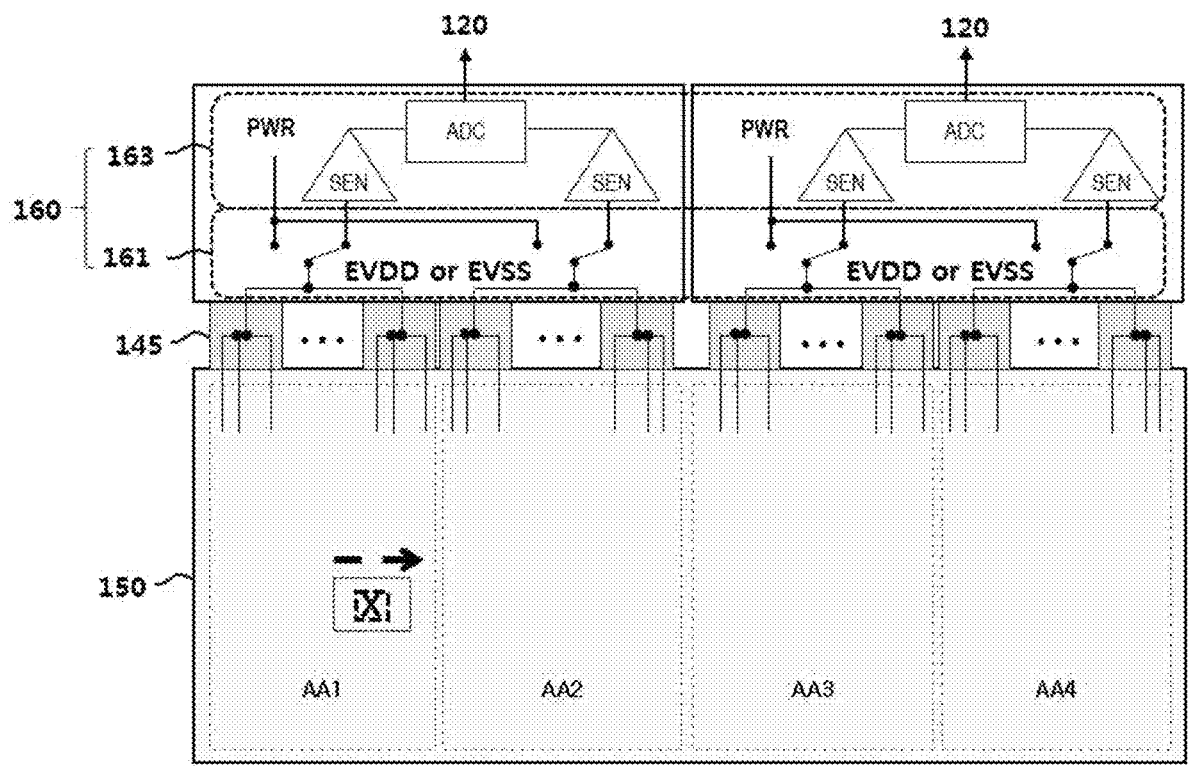
Figure 30:
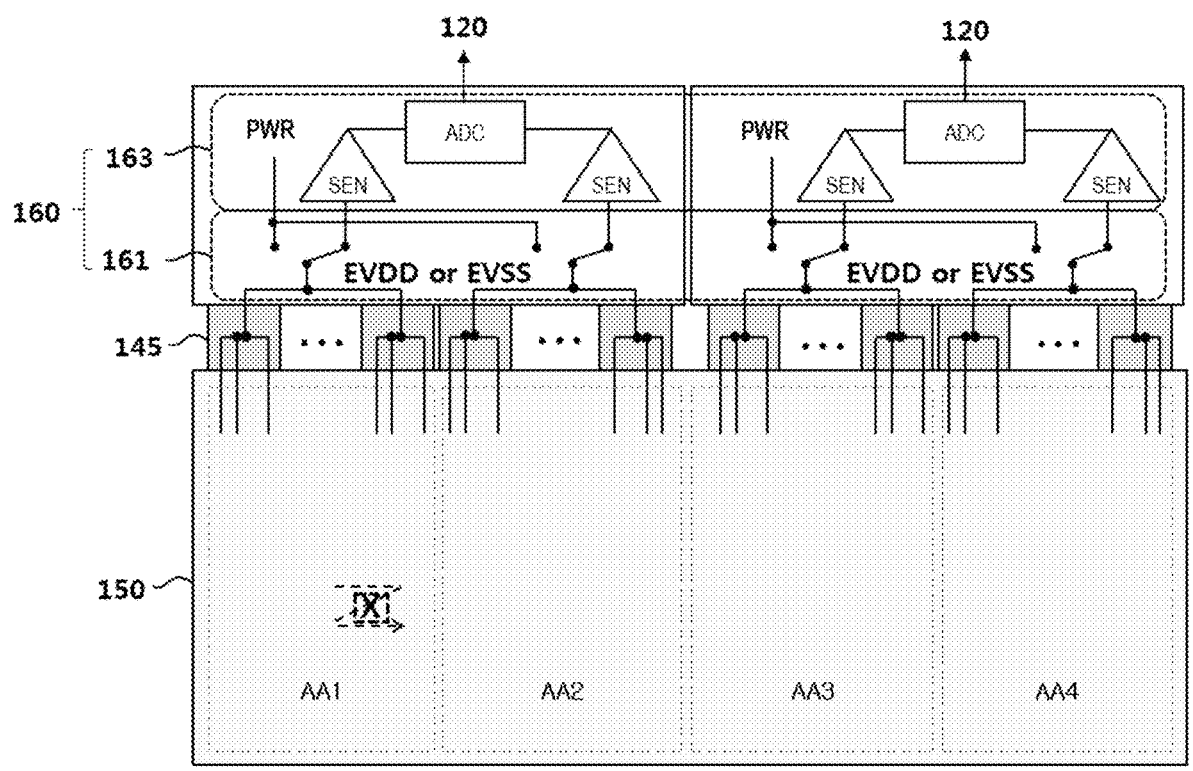

FIGS. 24 and 25 are diagrams explaining a method for detecting failure in a scanning manner on a pixel basis, using an example embodiment of the present invention. FIGS. 26 and 27 are diagrams explaining a method for detecting failure in a scanning manner on a block basis, using an example embodiment of the present invention. FIGS. 28 to 30 are diagrams explaining a block size and the number of sensing times in each step when a scanning method on a block basis is used.

As shown in FIGS. 24 and 26, in accordance with the example embodiment of the present invention, it can be possible to detect failure in a scanning manner on a pixel basis or a block basis using a subpixel failure sensing unit.

As shown in FIG. 25, for detection of subpixel failure in a pixel-basis scanning method, a scan signal and a data voltage are applied only to one pixel which is a sensing target (Scan On & Data On), without being applied to other pixels which are not sensing targets (Scan Off & Data Off). In accordance with illustration of FIG. 25, sensing targets can be defined in a first display area AA1 and a second display area AA2 on a pixel basis (Target P1 and Target P2), respectively. In FIG. 25, "X" indicated within the target P1 represents that there is failure in the sensed pixel. For example, a pixel can be scanned in each of the four different display areas AA1-AA4.

Current generation/current non-generation in a normal pixel and an abnormal pixel according to application/non-application of a scan signal and a data voltage and output results thereof are shown in the following Table 1.

TABLE 1

| | | Current Generation | Output Results |
|---|---|---|---|
| Data On | Normal Pixel | Current Not Generated | Noise |
| Data On | Abnormal Pixel | Current Generated | Sensing Value + Noise |
| Data Off | Normal/Abnormal Pixel | Current Not Generated | Noise |

As described above, the first display area AA1 and the second display area AA2 can be sensed in a pair, such that the first display area AA1 and the second display area AA2 can cooperate with each other to control noise (e.g., the noise sensed form two different pixels from a same display area can be compared against each other for noise cancelation). Similarly, the third display area AA3 and the fourth display area AA4 can be sensed in a pair, such that the third display area AA3 and the fourth display area AA4 can cooperate with each other to control noise. In this situation, only a scan signal is applied to the first to fourth display areas AA1 to AA4 in common, whereas a data voltage is separately applied to each of the first to fourth display areas AA1 to AA4 in an individual manner (e.g., that is, when sensing is performed on a pixel basis, the number of simultaneously-sensible pixels is two).

The time required for sensing of one display panel when the pixel-basis scanning method is used, as shown in FIGS. 24 and 25, is illustrated as follows. The following illustration corresponds to an example in which the size of the display panel is 2,160*3,840.

(1) Time taken for sensing of one subpixel: about 3 ms;
(2) Number of simultaneously-sensible subpixels: 2 ea; and
(3) Number of sensing times: 960*2,160*2.

Accordingly, the time required for sensing of one display panel can be 3 ms*960*2,160*2=12,441.6 s (3.456 Hr). When sensing is repeatedly performed two times, the time required for sensing of one display panel can be 6.912 Hr.

As shown in FIG. 27, for detection of subpixel failure in a block-basis scanning method, a scan signal and a data voltage are applied only to pixels of sensing target areas (Scan On & Data On), without being applied to other pixels of another area other than the sensing target areas (Scan Off & Data Off). In accordance with illustration of FIG. 27, sensing targets can be defined in the first display area AA1 and the second display area AA2 on a block basis (Target BL1 and Target BL2), respectively. In FIG. 27, "X" indicated within the target BL1 represents that there is failure in the sensed pixels.

Similarly to the pixel-basis scanning method, in the block-basis scanning method, the first display area AA1 and the second display area AA2 can be sensed in a pair such that the first display area AA1 and the second display area AA2 can cooperate with each other to control noise. Similarly, the third display area AA3 and the fourth display area AA4 can be sensed in a pair such that the third display area AA3 and the fourth display area AA4 can cooperate with each other to control noise. In this situation, only a scan signal is applied to the first to fourth display areas AA1 to AA4 in common, whereas a data voltage is separately applied to the first to fourth display areas AA1 to AA4 in an individual manner.

The time required for sensing of one display panel when the block-basis scanning method is used, as shown in FIGS. 26 and 27, is illustrated as follows. The following illustration corresponds to an example in which the size of the display panel is 2,160*960.

(1) Block size (x*y): 4*240→Time taken for sensing of one block: about 3 ms; and (2) Number of sensing times (2,160/x*960/y): 2,160.

Accordingly, the time required for sensing of one display panel when there is no failure can be 3 ms*2,160=6.5 s (when sensing is repeatedly performed two times, a time of 13 s is taken).

However, when one or more failures are present in the first display area AA1 of the display panel 150, sensing can be performed under the condition that the block size is gradually reduced, as in the first step of FIG. 29, the second step of FIG. 29, and the third step of FIG. 30. For example, conditions of (1) Block size: 4*240 and (2) Number of sensing times: 2,160 can be given in the first step, conditions of (1) Block size: 4*20 and (2) Number of sensing times: 12 per block can be given in the second step, and conditions of (1) Block size: 1*1 and (2) Number of sensing times: 80 per sub-block can be given in the third step.

When one failure is present in the first display area AA1 of the display panel 150 in a state in which the first to third steps are set as described above, the time required for sensing of one display panel can be "3 ms*2,160+3 ms*12+3 ms*80=6.7 s" (when sensing is repeatedly performed two times, a time of 13.5 s is taken).

When 50 failures are present in the first display area AA1 of the display panel 150, the time required for sensing of one display panel can be "3 ms*2,160+3 ms*12*50+3 ms*80*50=20.2 s" (when sensing is repeatedly performed two times, a time of 40.5 s is taken).

As apparent from the above description, in accordance with the example embodiments of the present invention, it can be possible to detect and determine whether or not elements included in a subpixel have failed, without the addition of a separate transistor or a separate sensing line to an interior of the subpixel circuit, thereby achieving an enhancement in lifespan and production yield while removing an afterimage while also minimizing the size of each subpixel circuit. In addition, in accordance with the example embodiments of the present invention, it can be possible to easily detect pixels having progressive failure generated after shipment of a display panel, thereby achieving an enhancement in reliability and stability. Furthermore, when the example embodiments of the present invention are applied to a subpixel implemented based on a circuit such as 2T1C, an enhancement in aperture ratio can be achieved. In addition, the example embodiments of the present invention are applicable to subpixels of various types and, as such, there is an effect of reducing costs while enhancing versatility of the resultant device.

The foregoing description and the accompanying drawings have been presented in order to illustratively explain technical ideas of the present invention. A person skilled in the art to which the present invention pertains can appreciate that diverse modifications and variations acquired by combining, dividing, substituting, or changing constituent elements can be possible without changing essential characteristics of the present invention. Therefore, the foregoing embodiments disclosed herein shall be interpreted as illustrative only and not as limitative of the principle and scope of the present invention. It should be understood that the scope of the present invention shall be defined by the appended claims and all of equivalents thereto fall within the scope of the present invention.

What is claimed is:

1. A light emitting display device comprising:
a display panel configured to display an image;
a driver configured to drive the display panel;
a controller configured to control the driver; and
a defect sensing circuit configured to:
sense a current through a driving voltage line transmitting a driving voltage for driving of the display panel, and
output a sensing value based on the current for determining whether an element in a subpixel of the display panel is defective,
wherein the defect sensing circuit is further configured to sense at least one of a first driving voltage line supplying a first driving voltage of a high voltage level to the display panel and a second driving voltage line supplying a second driving voltage of a low voltage level to the display panel, the high voltage level being greater than the low voltage level.

2. The light emitting display device according to claim 1, wherein the controller is further configured to:
analyze the sensing value output by the defect sensing circuit, and
determine that the element in the sensed sub-pixel is defective when the current is sensed through the driving voltage line.

3. The light emitting display device according to claim 1, wherein the controller is further configured to:
compare the sensing value to a predetermined value, and
in response to the sensing value being greater than the predetermined value, determining that the element in the subpixel is defective.

4. The light emitting display device according to claim 1, wherein the defect sensing circuit comprises:
a sensing circuit configured to sense a failure of the subpixel through the driving voltage line; and
a switch circuit configured to interconnect the driving voltage line and the sensing circuit.

5. The light emitting display device according to claim 4, wherein the switch circuit is configured to:
connect the driving voltage line to a driving voltage source and disconnect the driving voltage line from the sensing circuit during a driving period of the display panel, and
connect the driving voltage line to the sensing circuit and disconnect the driving voltage line from the driving voltage source during a sensing period.

6. The light emitting display device according to claim 4, wherein the defect sensing circuit further comprises:
a current amplification circuit configured to amplify a sensing current value transmitted through the switch circuit to generate an amplified sensing current value and output the amplified sensing current value;
a current-to-voltage converter configured to convert the amplified sensing current value output from the current amplification circuit into a sensing voltage value and output the sensing voltage value; and an analog-to-digital converter configured to convert the sensing voltage value output from the current-to-voltage converter into a digital form to generate a resultant value and output the resultant voltage value.

7. The light emitting display device according to claim 6, wherein the defect sensing circuit further comprises:
a noise removal circuit configured to remove a noise component of the sensing voltage value output from the current-to-voltage converter and transmit a filtered voltage value to the analog-to-digital converter.

8. The light emitting display device according to claim 7, wherein the noise removal circuit is configured to:
determine a difference value between a first sensing voltage value sensed from a first display area and a second sensing voltage value sensed from a second display area of the display panel,
amplify the difference value to generate an amplified difference value, and
output the amplified difference value as the filtered voltage value.

9. The light emitting display device according to claim 1, wherein the driving voltage line is divided into branched voltage lines corresponding to respective display areas of the display panel.

10. The light emitting display device according to claim 8, wherein the display panel further comprises a voltage line connector configured to connect the branched voltage lines in common with each other.

11. A method of controlling a light emitting display device comprising a display panel configured to display an image, a driver configured to drive the display panel, a controller configured to control the driver, and a defect sensing circuit configured to sense a current through a driving voltage line transmitting a driving voltage for driving of the display panel, the method comprising:
driving at least one first pixel disposed in a first display area of the display panel and at least one second pixel disposed in a second display area of the display panel;
sensing a driving voltage line connected to the at least one first pixel and a driving voltage line connected to the at least one second pixel; and
determining a failure of an element within the at least one first pixel or the at least one second pixel, based on a first sensing current value sensed through the driving voltage line connected to the at least one first pixel and a second sensing current value sensed through the driving voltage line connected to the at least one second pixel.

12. The method according to claim 11, wherein at least one of the first sensing current value and the second sensing current value is used as a reference for removal of a noise component.

13. A defect sensing device comprising:
a defect sensing circuit including:
a first sensing circuit configured to sense a first current flowing through a first portion of a driving voltage line that supplies a driving voltage to a display panel; and
a second sensing circuit configured to sense a second current flowing through a second portion of the driving voltage line,
wherein the defect sensing circuit is configured to:
sense a current flowing through at least one of the first portion of the driving voltage line or the second portion of the driving voltage line, and
output a sensing value based on the current for determining that a defective element exists within a first subpixel connected to the first portion of the driving voltage line or a second subpixel connected to the second portion of the driving voltage line.

14. The defect sensing device according to claim 13, wherein the driving voltage line is a first driving voltage line for supplying a high voltage level to the display panel or a second driving voltage line for supplying a low voltage level to the display panel, the high voltage level being greater than the low voltage level.

15. The defect sensing device according to claim 13, further comprising:
a switching circuit including:
a first switch connected between the first subpixel and the first sensing circuit; and
a second switch connected between the first subpixel and the first sensing circuit, wherein the switching circuit is configured to:
connect the first portion of the driving voltage line to the driving voltage source and disconnect the first portion of the driving voltage line from the first sensing circuit via the first switch and connect the second portion of the driving voltage line to the driving voltage source and disconnect the second portion of the driving voltage line from the second sensing circuit via the second switch, during a driving period of the display panel, and
disconnect the first portion of the driving voltage line from the driving voltage source and connect the first portion of the driving voltage line to the first sensing circuit via the first switch and disconnect the second portion of the driving voltage line from the driving voltage source and connect the second portion of the driving voltage line to the second sensing circuit via the second switch, during a sensing period.

16. The defect sensing device according to claim 15, wherein the defect sensing circuit is configured to:
determine a difference between the first current and the second current,
remove a noise component from the current sensed flowing through the at least one of the first portion of the driving voltage line or the second portion of the driving voltage line based on the difference between the first current and the second current to generate a filtered value, and
output the sensing value based on the filtered value.

17. The defect sensing device according to claim 13, further comprising:
a controller is configured to:
compare the sensing value to a predetermined value, and
in response to the sensing value being greater than the predetermined value, determining that the defective element exists within the first subpixel or the second subpixel.

18. The defect sensing device according to claim 13, further comprising:
a voltage line connector,
wherein the first portion of the driving voltage line or the second portion of the driving voltage line branches into a plurality of branched driving voltage lines connected to a group of subpixels within the display panel, and
wherein the voltage line connector is configured to connect the plurality of branched driving voltage lines in common with each other.

19. The defect sensing device according to claim 13, wherein the defect sensing circuit is configured to:

scan the display panel for defective elements on a block basis when a scan signal and a data voltage are applied only to a group of subpixels win a sensing target area within the display panel, while the data voltage and the scan signal are not applied to other subpixels in other areas of the display panel that are different than the sensing target area.

\* \* \* \* \*